United States Patent
Shin et al.

(10) Patent No.: US 12,531,122 B2
(45) Date of Patent: Jan. 20, 2026

(54) OPERATION METHOD OF MEMORY DEVICE INCLUDING MEMORY BLOCK CONNECTED TO WORDLINES

(71) Applicant: SAMSUNG ELECTRONICS CO., LTD., Suwon-si (KR)

(72) Inventors: Dongjin Shin, Suwon-si (KR); Sang-Won Park, Suwon-si (KR); Won-Taeck Jung, Suwon-si (KR); Byungsoo Kim, Suwon-si (KR); Su Chang Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 144 days.

(21) Appl. No.: 18/207,979

(22) Filed: Jun. 9, 2023

(65) Prior Publication Data
US 2024/0005992 A1 Jan. 4, 2024

(30) Foreign Application Priority Data
Jul. 1, 2022 (KR) .................. 10-2022-0081279

(51) Int. Cl.
*G11C 16/08* (2006.01)
*G06F 13/16* (2006.01)
(Continued)

(52) U.S. Cl.
CPC .......... *G11C 16/08* (2013.01); *G11C 16/0433* (2013.01); *G11C 16/24* (2013.01)

(58) Field of Classification Search
CPC ..... G11C 16/08; G11C 16/0433; G11C 16/24; G11C 5/143; G11C 8/12; G11C 16/32; G11C 16/0483; G11C 16/30; G11C 8/08; G11C 5/147; G11C 16/3418; G06F 13/1668
See application file for complete search history.

(56) References Cited

U.S. PATENT DOCUMENTS 5,673,224 A * 9/1997 Chevallier ............. G11C 16/10
  365/185.23
5,680,347 A * 10/1997 Takeuchi ........... G11C 16/0483
  365/185.17
(Continued)

FOREIGN PATENT DOCUMENTS

| KR | 20000023005 A | 4/2000 |
| KR | 20060021471 A | 3/2006 |
| KR | 20170055910 A | 5/2017 |

*Primary Examiner* — Son T Dinh
*Assistant Examiner* — Elizabeth Rose Agger
(74) *Attorney, Agent, or Firm* — Fish & Richardson P.C.

(57) ABSTRACT

An operation method of a memory device, having a memory block connected with wordlines, includes: (1) receiving a command from a memory controller, (2) activating a first block selection signal controlling first pass transistors configured to connect the wordlines connected with the memory block with driving lines, and (3) controlling the wordlines such that a first operation corresponding to the command is performed. After the first operation is completed, the method further includes: (4) pre-charging channels of the memory block with a first voltage and (5) performing a mode recovery operation such that the wordlines are controlled with a recovery voltage. The mode recovery operation includes deactivating the first block selection signal.

20 Claims, 18 Drawing Sheets

(51) Int. Cl.
*G11C 8/08* (2006.01)
*G11C 8/12* (2006.01)
*G11C 16/04* (2006.01)
*G11C 16/24* (2006.01)
*G11C 5/14* (2006.01)
*G11C 16/30* (2006.01)
*G11C 16/32* (2006.01)
*G11C 16/34* (2006.01)

(56) References Cited

U.S. PATENT DOCUMENTS

| | | |
|---|---|---|
| 8,456,918 B2 | 6/2013 | Oh et al. |
| 8,611,148 B2 | 12/2013 | Dutta et al. |
| 10,515,711 B2 | 12/2019 | Lee |
| 10,607,688 B2 | 3/2020 | Shin et al. |
| 10,726,891 B1 | 7/2020 | Prakash et al. |
| 11,043,280 B1* | 6/2021 | Prakash .............. G11C 11/5671 |
| 11,139,022 B1* | 10/2021 | Tei ...................... G11C 11/5642 |
| 11,205,471 B2 | 12/2021 | Choi et al. |
| 2006/0050594 A1* | 3/2006 | Park ....................... G11C 16/16 365/230.05 |
| 2007/0019474 A1* | 1/2007 | Kim ....................... G11C 16/10 365/185.18 |
| 2007/0127292 A1* | 6/2007 | Sakui ..................... G11C 16/10 365/185.17 |
| 2011/0019486 A1* | 1/2011 | Jang ....................... G11C 16/10 365/185.25 |
| 2011/0096598 A1* | 4/2011 | Takeuchi ........... G11C 16/3418 365/185.03 |
| 2017/0140823 A1* | 5/2017 | Missiroli ............... G11C 16/26 |
| 2021/0174884 A1* | 6/2021 | Jia ...................... G11C 16/0483 |
| 2022/0068390 A1 | 3/2022 | Wang et al. |
| 2022/0215888 A1* | 7/2022 | Song ..................... G11C 16/24 |
| 2022/0215889 A1* | 7/2022 | Lim .................... G11C 16/3459 |
| 2023/0134907 A1* | 5/2023 | Lee ....................... G11C 16/08 365/185.11 |

* cited by examiner

OPERATION METHOD OF MEMORY DEVICE INCLUDING MEMORY BLOCK CONNECTED TO WORDLINES

CROSS-REFERENCE TO RELATED APPLICATIONS

This application claims priority under 35 U.S.C. § 119 to Korean Patent Application No. 10-2022-0081279 filed on Jul. 1, 2022, in the Korean Intellectual Property Office, the disclosure of which is incorporated by reference herein in its entirety.

BACKGROUND

Embodiments of the present disclosure described herein relate to a semiconductor memory and, more particularly, relate to an operation method of a memory device including a memory block connected with a plurality of wordlines.

A semiconductor memory is classified as: (1) a volatile memory, in which stored data disappear when power is turned off, such as a static random access memory (SRAM) or a dynamic random access memory (DRAM), or (2) a nonvolatile memory, in which stored data are retained even when power is turned off, such as a flash memory, a phase-change RAM (PRAM), a magnetic RAM (MRAM), a resistive RAM (RRAM), or a ferroelectric RAM (FRAM).

The flash memory is being widely used as high-capacity storage of a computing system. The flash memory performs a read operation or a program operation by controlling voltages of a plurality of wordlines connected with memory cells. After completing the read operation or the program operation, the flash memory controls the voltages of the wordlines so as to be set with a given level. In this case, due to a physical structural characteristic of the flash memory, a channel voltage of the flash memory decreases. The decrease in the channel voltage may cause an increase in a voltage difference of a channel and a wordline, thereby reducing the reliability of memory cells.

SUMMARY

Embodiments of the present disclosure provide an operation method of a memory device with improved reliability. The memory device includes a memory block connected with a plurality of wordlines.

According to an embodiment, an operation method of a memory device, which includes a memory block connected with wordlines, includes: (1) receiving a command from a memory controller, (2) activating a first block selection signal controlling first pass transistors, configured to connect the wordlines connected with the memory block with driving lines, and (3) controlling the wordlines such that a first operation corresponding to the command is performed. After the first operation is completed, the method further includes: (4) pre-charging channels of the memory block with a first voltage and (5) performing a mode recovery operation such that the wordlines are controlled with a recovery voltage. The mode recovery operation includes deactivating the first block selection signal.

According to an embodiment, an operation method of a memory device, which includes a memory block connected with wordlines, a string selection line and a ground selection line, includes: (1) receiving a command from a memory controller, (2) activating a first block selection signal controlling first pass transistors, configured to connect the wordlines connected with the memory block with driving lines, (3) controlling the wordlines such that a first operation corresponding to the command is performed, (4) pre-charging channels of the memory block with a first voltage, (5) setting the wordlines connected with the memory block with a recovery voltage, (6) setting the string selection line and the ground selection line with a ground voltage, and (7) deactivating the first block selection signal.

According to an embodiment, an operation method of a memory device, which includes a memory block connected with wordlines, a string selection line and a ground selection line, includes: (1) receiving a read command from a memory controller, (2) performing a wordline setup operation in response to the read command by applying a non-selection read voltage to unselected wordlines among the wordlines, (3) applying a pass voltage to the string selection line, (4) applying the pass voltage to the ground selection line, (5) performing a sensing operation by applying at least one read voltage to a selected wordline among the wordlines, and (6) performing a mode recovery operation such that the wordlines are set with a recovery voltage and the string selection line and the ground selection line are set with a ground voltage. The mode recovery operation includes an operation of pre-charging channels of the memory block through bitlines or a common source line connected with the memory block. A first block selection signal corresponding to the memory block is activated during the wordline setup operation, the sensing operation, and the mode recovery operation. The first block selection signal is deactivated after the mode recovery operation is completed.

According to an embodiment, an operation method of a memory device, which includes a memory block addressed by word lines and bit lines, the method includes executing a memory command with respect to the memory block; and in response to completing the execution of the memory command, executing a mode recovery operation that includes pre-charging a channel voltage of a channel within the memory block that directly electrically interconnects memory cells, each of the memory cells addressed by a bit line, among the bit lines, and a different one of the word lines.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that an ordinary one in the art easily implements the disclosure.

Figure 1:
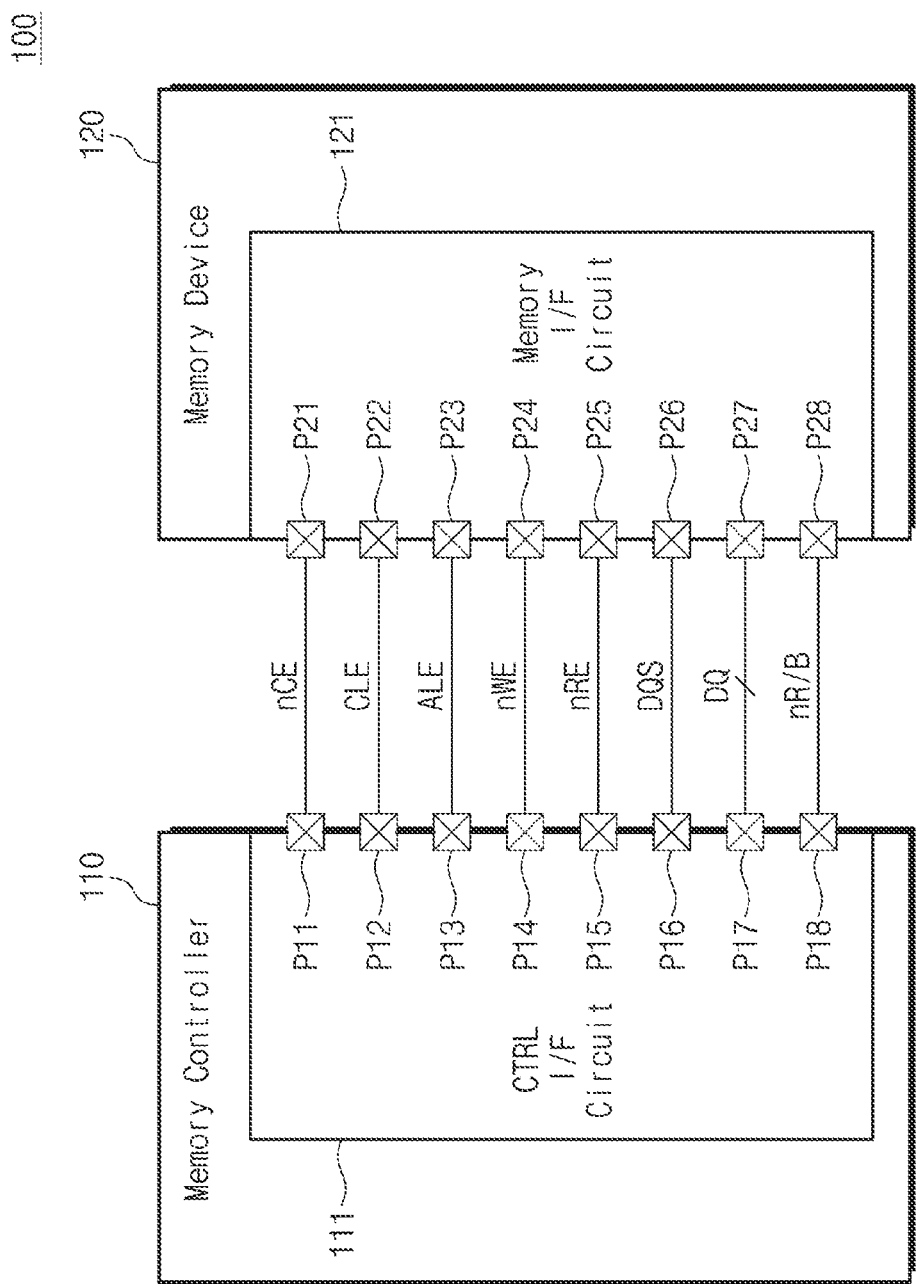
FIG. 1 is a block diagram illustrating a memory system according to an embodiment of the present disclosure.

FIG. 1 is a block diagram illustrating a memory system according to an embodiment of the present disclosure. Referring to FIG. 1, a memory system 100 may include a memory controller 110 and a memory device 120. In an embodiment, the memory system 100 may be implemented with a high-capacity storage device such as a solid state drive (SSD). In an embodiment, the memory device 120 may be a nonvolatile memory device configured to communicate with the memory controller 110 through a plurality of channels.

The memory controller 110 may include a controller interface circuit 111. The memory device 120 may include a memory interface circuit 121. The controller interface circuit 111 and the memory interface circuit 121 may exchange various signals through a plurality of pins P11 to P18 and P21 to P28.

For example, the memory controller 110 may send a chip enable signal nCE to the memory device 120 through the eleventh pin P11. In an embodiment, the memory device 120 may be selected in response to the chip enable signal nCE being activated (e.g., to a low level). The memory controller 110 may send a command latch enable signal CLE, an address latch enable signal ALE, a write enable signal nWE, and a read enable signal nRE to the memory device 120 selected by the chip enable signal nCE through the twelfth to fifteenth pins P12 to P15. The memory controller 110 may exchange a data strobe signal DQS and a data signal DQ with the memory device 120 through the sixteenth and seventeenth pins P16 and P17. In an embodiment, the data signal DQ may include a command, an address, or data. The memory controller 110 may receive a ready/busy signal nR/B from the memory device 120 through the eighteenth pin P18.

The memory device 120 may receive the chip enable signal nCE from the memory controller 110 through the 21st pin P21. The memory device 120 may receive the command latch enable signal CLE, the address latch enable signal ALE, the write enable signal nWE, and the read enable signal nRE from the memory controller 110 through the 22nd to 25th pins P22 to P25. The memory device 120 may exchange the data strobe signal DQS and the data signal DQ with the memory controller 110 through the 26th and 27th pins P26 and P27. The memory device 120 may send the ready/busy signal nR/B to the memory controller 110 through the 28th pin P28.

The memory controller 110 and the memory device 120 may perform various operations through various signals. In a command input operation of the memory device 120, the controller interface circuit 111 of the memory controller 110 may activate the command latch enable signal CLE and may send the data signals DQ including the command to the memory device 120 together with the write enable signal nWE toggling. The memory interface circuit 121 of the memory device 120 may obtain the command from the data signals DQ received in an enable period (e.g., high-level period) of the command latch enable signal CLE, based on toggle timings of the write enable signal nWE. For example, the memory device 120 may obtain the command by sampling the data signals DQ at the rising edge of the write enable signal nWE, in the enable period (e.g., high-level period) of the command latch enable signal CLE.

In an address input operation of the memory device 120, the controller interface circuit 111 of the memory controller 110 may activate the address latch enable signal ALE and may send the data signals DQ including the address to the memory device 120 together with the write enable signal nWE toggling. The memory interface circuit 121 of the memory device 120 may obtain the address from the data signals DQ received in an enable period (e.g., high-level period) of the address latch enable signal ALE, based on toggle timings of the write enable signal nWE. For example, the memory device 120 may obtain the address by sampling the data signals DQ at the rising edge of the write enable signal nWE, in the enable period (e.g., high-level period) of the address latch enable signal ALE.

In a data output operation of the memory device 120, the controller interface circuit 111 of the memory controller 110 may generate the read enable signal nRE toggling and may send the read enable signal nRE to the memory device 120. The memory interface circuit 121 of the memory device 120 may receive the read enable signal nRE toggling. The memory interface circuit 121 may generate the data strobe signal DQS toggling, based on the toggling of the read enable signal nRE. For example, the memory interface circuit 121 may generate the data strobe signal DQS that starts to toggle after a given delay (e.g., tDQSRE) from a time at which the read enable signal nRE starts to toggle. The data strobe signal DQS thus generated may be transferred to the memory controller 110. The memory interface circuit 121 may output the data signals DQ including data based on toggle timings of the data strobe signal DQS. For example, the memory interface circuit 121 may output the data signals DQ including the data in synchronization with the rising edge and the falling edge of the data strobe signal DQS. As such, the data may be aligned with the toggle timings of the data strobe signal DQS and may be transferred to the memory controller 110. The controller interface circuit 111 of the memory controller 110 may obtain the data from the data signals DQ based on the toggle timings of the data strobe signal DQS. For example, the controller interface circuit 111 of the memory controller 110 may obtain the data by sampling the data signals DQ at the rising edge and the falling edge of the data strobe signal DQS.

In the data input operation of the memory device 120, the controller interface circuit 111 of the memory controller 110 may send the data signals DQ including data together with the data strobe signal DQS toggling to the memory device 120. The memory interface circuit 121 of the memory device 120 may receive the data strobe signal DQS toggling from the memory controller 110 and may receive the data signals DQ including the data from the memory controller 110. The memory interface circuit 121 may obtain the data from the data signals DQ based on toggle timings of the data strobe signal DQS. For example, the memory interface circuit 121 may obtain the data by sampling the data signals DQ at the rising edge and the falling edge of the data strobe signal DQS.

The memory interface circuit 121 of the memory device 120 may send the ready/busy signal nR/B to the memory controller 110. The memory interface circuit 121 may send status information of the memory device 120 to the memory controller 110 through the ready/busy signal nR/B. When the memory device 120 is in a busy state (i.e., when internal operations of the memory device 120 are being performed), the memory interface circuit 121 may send the ready/busy signal nR/B indicating the busy state to the memory controller 110. When the memory device 120 is in a ready state (i.e., when the internal operations of the memory device 120 are not performed or are completed), the memory interface circuit 121 may send the ready/busy signal nR/B indicating the ready state to the memory controller 110. For example, while the memory device 120 reads data from a memory cell array in response to a page read command, the memory interface circuit 121 may send the ready/busy signal nR/B indicating the busy state (e.g., having the low level) to the memory controller 110. For example, while the memory device 120 programs data in the memory cell array in response to a program command, the memory interface circuit 121 may send the ready/busy signal nR/B indicating the busy state to the memory controller 110. The controller interface circuit 111 of the memory controller 110 may receive the ready/busy signal nR/B from the memory device 120. The controller interface circuit 111 may determine the state of the memory device 120 based on the ready/busy signal nR/B.

Figure 2:
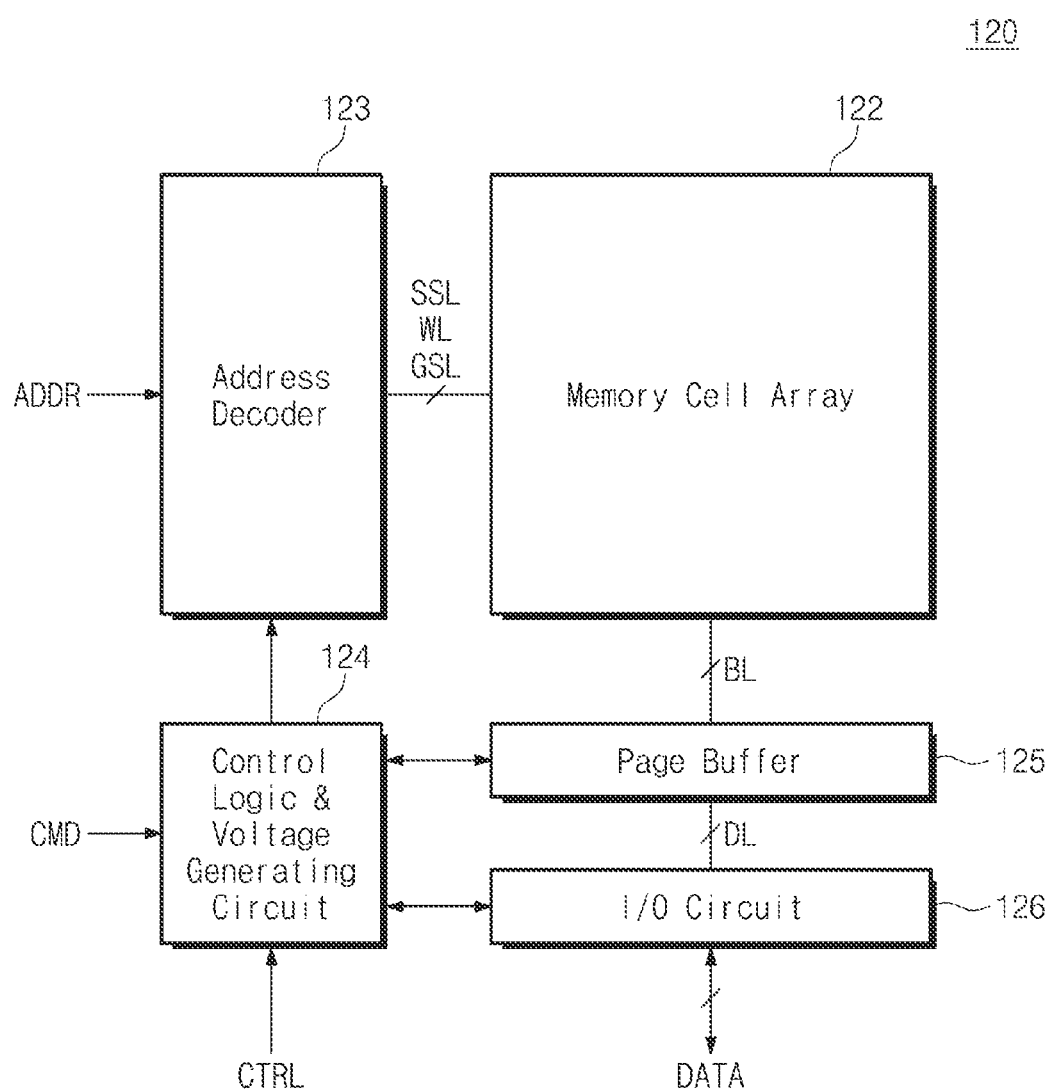
FIG. 2 is a block diagram illustrating a memory device of FIG. 1.

FIG. 2 is a block diagram illustrating a memory device of FIG. 1. Referring to FIGS. 1 and 2, the memory device 120 may be a nonvolatile memory device such as a NAND flash memory device. However, the present disclosure is not limited thereto. An embodiment where various signals such as a command CMD, an address ADDR, a control signal CTRL, and data "DATA" are directly input to various function blocks is illustrated in FIG. 2, but the present disclosure is not limited thereto. For example, various signals such as a command CMD, an address ADDR, a control signal CTRL, and data "DATA" may be exchanged through the data signals DQ as described with reference to FIG. 1. In an embodiment, the memory interface circuit 121 described with reference to FIG. 1 may be included in an input/output circuit 126.

The memory device 120 may include a memory cell array 122, an address decoder 123, a control logic and voltage generating circuit 124, a page buffer 125, and the input/output circuit 126. The memory cell array 122 may include a plurality of memory blocks. Each of the plurality of memory blocks may include a plurality of cell strings, each of which includes a plurality of cell transistors. The plurality of cell transistors may be connected in series between bitlines BL and a common source line CSL and may be connected with string selection lines SSL, wordlines WL, and ground selection lines GSL. A structure of each of the plurality of memory blocks will be described in detail with reference to FIG. 3.

The address decoder 123 may be connected with the memory cell array 122 through the string selection lines SSL, the wordlines WL, the ground selection lines GSL, and the erase control lines ECL. The address decoder 123 may receive and decode an address ADDR from the memory controller 110. The address decoder 123 may control the string selection lines SSL, the wordlines WL, the ground selection lines GSL, and the erase control lines ECL based on a decoding result.

The control logic and voltage generating circuit 124 may control various components of the memory device 120 in response to the signals (e.g., the command CMD and the control signal CTRL) received from the memory controller 110.

The control logic and voltage generating circuit 124 may generate various operation voltages necessary for the memory device 120 to operate. For example, the control logic and voltage generating circuit 120 may generate various operation voltages such as a plurality of program voltages, a plurality of pass voltages, a plurality of verify voltages, a plurality of read voltages, a plurality of non-selection read voltages, a plurality of erase voltages, and a plurality of erase verify voltages. Various voltages to be described below may be generated by the control logic and voltage generating circuit 124.

A page buffer circuit 125 may be connected with the memory cell array 122 through the bitlines BL. The page buffer 125 may read data stored in the memory cell array 122 by sensing voltage changes of the bitlines BL. The page buffer circuit 125 may store data in the memory cell array 122 by controlling voltages of the bitlines BL.

The input/output circuit 126 may receive the data "DATA" from the memory controller 110 and may transfer the received data "DATA" to the page buffer circuit 125. The input/output circuit 126 may receive the data "DATA" from the page buffer circuit 125 and may provide the received data "DATA" to the memory controller 110.

Figure 3:
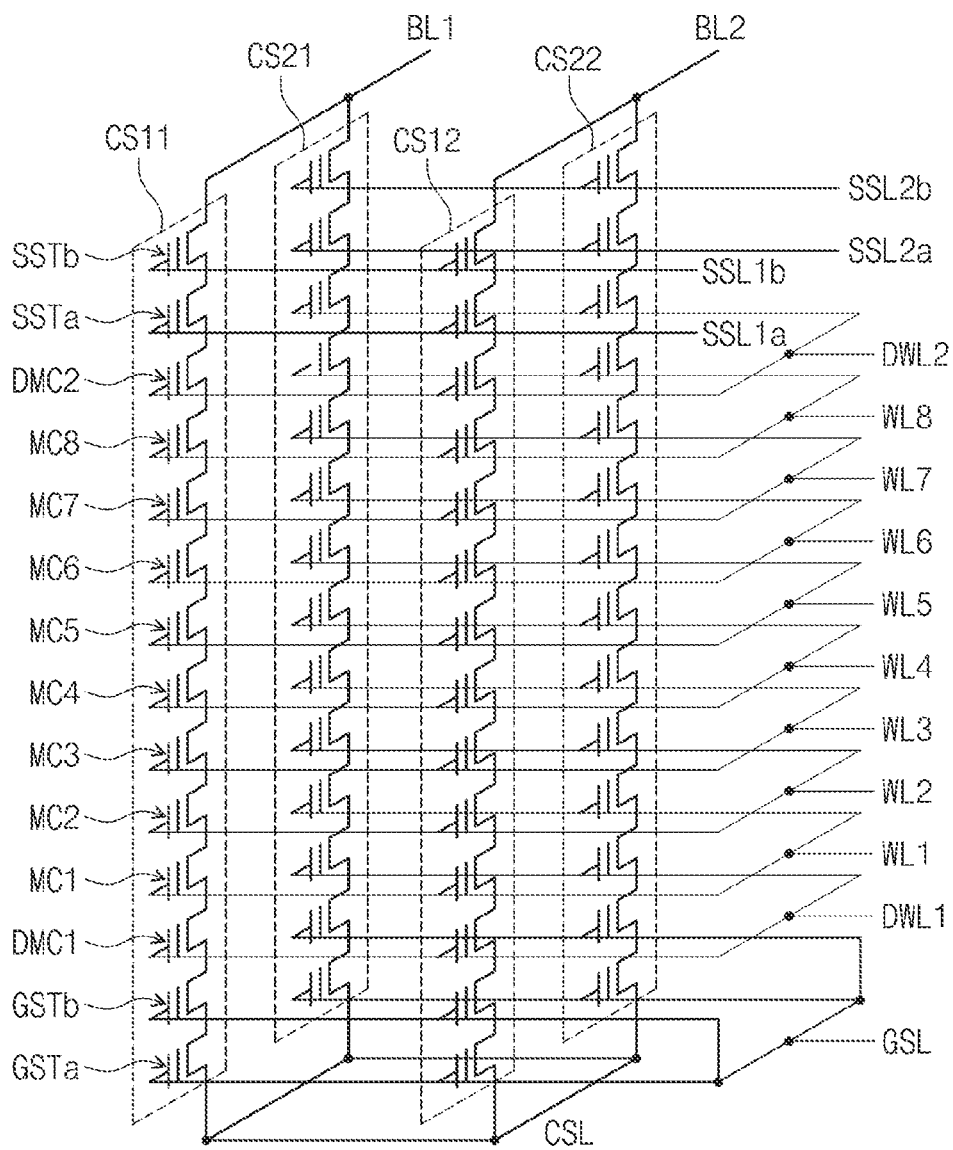
FIG. 3 is a circuit diagram illustrating one of a plurality of memory blocks included in a memory cell array in FIG. 2.
Figure 3:
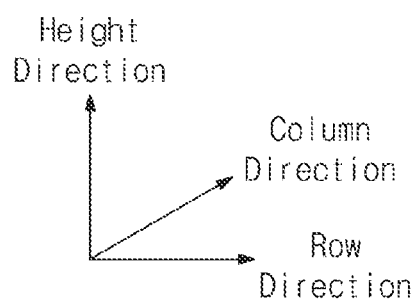

FIG. 3 is a circuit diagram illustrating one of a plurality of memory blocks included in a memory cell array in FIG. 2. A memory block of a three-dimensional structure will be described with reference to FIG. 3, but the present disclosure is not limited thereto. A memory block according to the present disclosure may have a two-dimensional memory block structure. A first memory block BLK1 will be described with reference to FIG. 3, but the present disclosure is not limited thereto. The remaining memory blocks may be similar in structure to the first memory block BLK1 to be described with reference to FIG. 3.

In an embodiment, the first memory block BLK1 to be described with reference to FIG. 3 may correspond to a physical erase unit of the memory device 120. However, the present disclosure is not limited thereto. For example, the memory device 120 may perform the erase operation in units of page, wordline, sub-block, or plane.

Referring to FIGS. 2 and 3, the first memory block BLK1 may include a plurality of cell strings CS11, CS12, CS21, and CS22. The plurality of cell strings CS11, CS12, CS21, and CS22 may be arranged in a row direction and a column direction to form rows and columns.

Each of the plurality of cell strings CS11, CS12, CS21, and CS22 includes a plurality of cell transistors. For example, each of the cell strings CS11, CS12, CS21, and CS22 may include string selection transistors SSTa and SSTb, a plurality of memory cells MC1 to MC8, ground selection transistors GSTa and GSTb, and dummy memory cells DMC1 and DMC2. In an embodiment, each of the plurality of cell transistors included in the cell strings CS11, CS12, CS21, and CS22 may be a charge trap flash (CTF) memory cell.

In each cell string, the plurality of memory cells MC1 to MC8 are serially connected and are stacked in a height direction that is a direction perpendicular to a plane defined by the row direction and the column direction or to a substrate. In each cell string, the string selection transistors SSTa and SSTb are serially connected and are interposed between a bitline BL1 or BL2 and the plurality of memory cells MC1 to MC8. In each cell string, the ground selection transistors GSTa and GSTb are connected in series between the plurality of memory cells MC1 to MC8 and the common source line CSL.

In an embodiment, in each cell string, the first dummy memory cell DMC1 may be interposed between the plurality of memory cells MC1 to MC8 and the ground selection transistors GSTa and GSTb. In an embodiment, the second dummy memory cell DMC2 may be interposed between the string selection transistors SSTa and SSTb and the plurality of memory cells MC1 to MC8.

The ground selection transistors GSTa and GSTb may be connected with the same ground selection line GSL. However, the present disclosure is not limited thereto. For example, ground selection transistors, which belong to the same row, from among the ground selection transistors GSTa or GSTb placed at the same height may be connected with the same ground selection line and ground selection transistors, which belong to another row, from among the ground selection transistors GSTa or GSTb may be connected with another ground selection line. Alternatively, ground selection transistors at same heights may be connected with the same ground selection line. Alternatively, ground selection transistors belonging to at least two rows from among ground selection transistors at the same height may be connected with the same ground selection line and ground selection transistors belonging to at least two other rows from among ground selection transistors at the same height may be connected with another ground selection line Alternatively, ground selection transistors at different heights may be connected with the same ground selection line. A connection relationship between the ground selection transistors GSTa and GSTb and the ground selection line GSL may be variously changed and modified.

Memory cells of the same height from the substrate or the ground selection transistors GSTa and GSTb may be connected in common with the same wordline, and memory cells of different heights therefrom may be connected to different wordlines. For example, the memory cells MC1 to MC8 of the cell strings CS11, CS12, CS21, and CS22 may be connected with first to eighth wordlines WL1 to WL8.

String selection transistors, which belong to the same row, from among the first string selection transistors SSTa of the same height are connected with the same string selection line, and string selection transistors, which belong to another row, from among the first string selection transistors SSTa are connected with another string selection line. For example, the first string selection transistors SSTa of the cell strings CS11 and CS12 in the first row may be connected in common with a string selection line SSL1a and the first string selection transistors SSTa of the cell strings CS21 and CS22 in the second row may be connected in common to a string selection line SSL2a.

Likewise, string selection transistors, which belong to the same row, from among the second string selection transistors SSTb at the same height are connected with the same string selection line and string selection transistors, which belong to another row, from among the second string selection transistors SSTb are connected with another string selection line. For example, the second string selection transistors SSTb of the cell strings CS11 and CS12 in the first row are connected in common with a string selection line SSL1b and the second string selection transistors SSTb of the cell strings CS21 and CS22 in the second row may be connected in common with a string selection line SSL2b.

In an embodiment, dummy memory cells of the same height are connected with the same dummy wordline and dummy memory cells of different heights are connected with different dummy wordlines. For example, the first dummy memory cells DMC1 are connected with a first dummy wordline DWL1 and the second dummy memory cells DMC2 are connected with a second dummy wordline DWL2.

In an embodiment, in each cell string, a first erase control transistor may be provided between the ground selection transistors GSTa and GSTb and the common source line CSL. In each cell string, a second erase control transistor may be provided between the bitline BL1 or BL2 and the string selection transistors SSTa and SSTb. The first and second erase control transistors may be used to charge channels of the cell strings CS11, CS12, CS21, and CS22 with an erase voltage or to erase the first memory block BLK1, based on a gate induced drain leakage (GIDL) phenomenon. The first erase control transistors of the cell strings CS11, CS12, CS21, and CS22 may be connected in common with a first erase control line. The second erase control transistors of the cell strings CS11, CS12, CS21, and CS22 may be connected in common with a second erase control line. However, the present disclosure is not limited thereto. For example, the first and second erase control transistors of the cell strings CS11, CS12, CS21, and CS22 may be connected with different erase control lines through various manners described above.

In an embodiment, the first memory block BLK1 illustrated in FIG. 3 is provided only as an example. The number of cell strings may increase or decrease, and the number of rows of cell strings and the number of columns of cell strings may increase or decrease depending on the number of cell strings. Also, the number of cell transistors (i.e., GST, MC, DMC, and SST) of the first memory block BLK1 may increase or decrease and the height of the first memory block BLK1 may increase or decrease depending on the number of cell transistors. In addition, the number of lines (i.e., GSL, WL, DWL, and SSL) connected with cell transistors may increase or decrease depending on the number of cell transistors.

Figure 4:
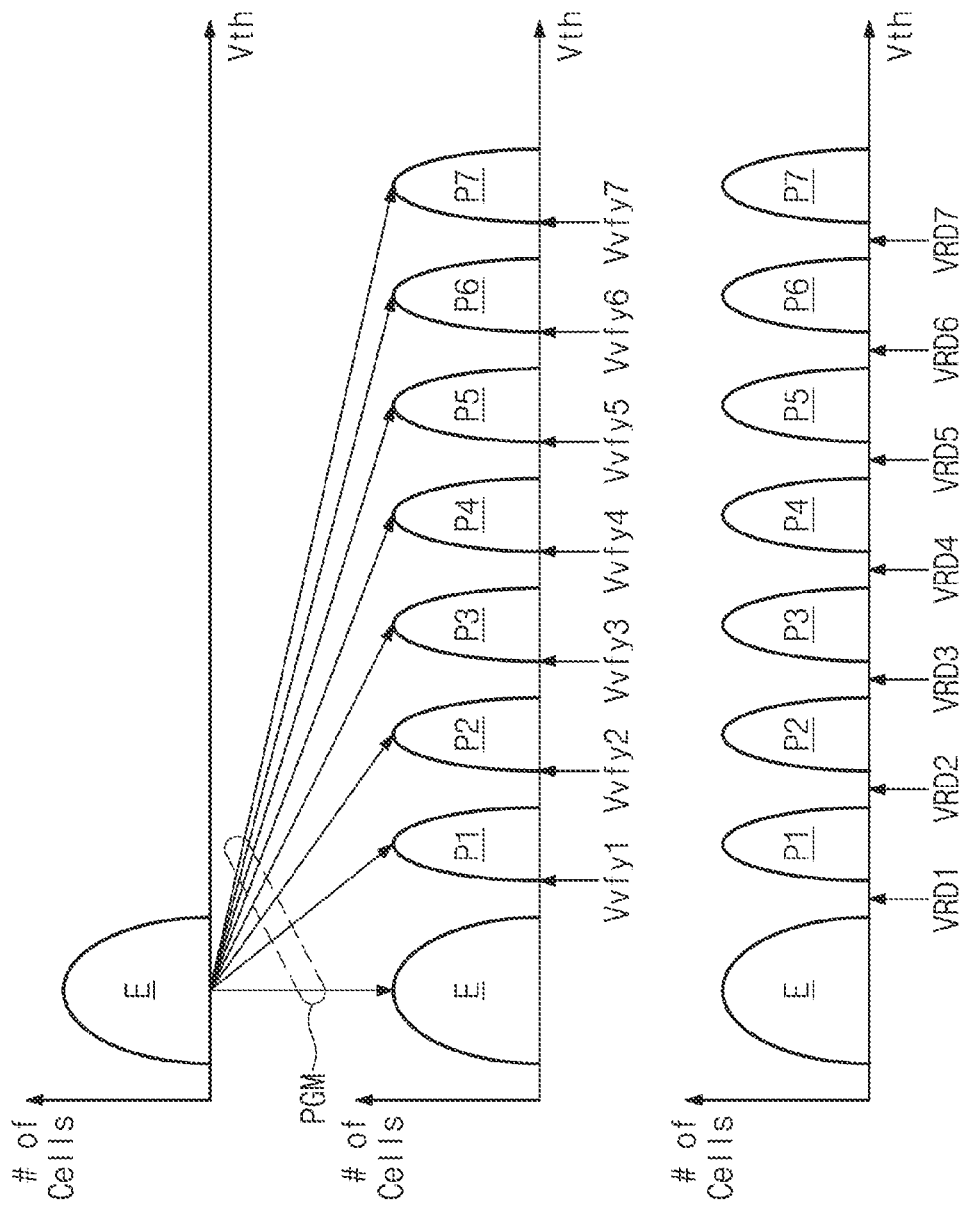
FIG. 4 is a distribution diagram illustrating threshold voltage distributions of memory cells included in a first memory block of FIG. 3.

FIG. 4 is a distribution diagram illustrating threshold voltage distributions of memory cells included in a first memory block of FIG. 3. In the distributions of FIG. 4, a horizontal axis represents a threshold voltage Vth and a vertical axis represents the number of memory cells. For convenience of description, it is assumed that each memory cell is a triple level cell configured to store 3-bit data. However, the present disclosure is not limited thereto. For example, each memory cell may be implemented in the form of a single level cell (SLC), multi-level cell (MLC), triple-level cell (TLC), quad-level cell (QLC), or penta-level cell (PLC).

Referring to FIGS. 2 to 4, the memory device 120 may store data in memory cells by controlling threshold voltages of the memory cells MC1 to MC8 of the first memory block BLK1. For example, each of the memory cells MC1 to MC8 may be programmed to have one of an erase state "E" and first to seventh program states P1 to P7.

The memory device 120 may verify states of the memory cells by using a plurality of verification voltages Vvfy1 to Vvfy7. For example, the memory device 120 may verify whether memory cells corresponding to the first program state P1 are normally programmed, by using the first verification voltage Vvfy1. The memory device 120 may verify whether memory cells corresponding to the second program state P2 are normally programmed, by using the second verification voltage Vvfy2. Likewise, the memory device 120 may verify whether memory cells corresponding to the third to seventh program states P3 to P7 are normally programmed, by using the third to seventh verification voltages Vvfy3 to Vvfy7.

The memory device 120 may read data stored in memory cells by sensing program states (i.e., threshold voltages) of the memory cells. For example, the memory device 120 may read data stored in the memory cells by sensing the threshold voltages of the memory cells by using a plurality of read voltages VRD1 to VRD7.

In an embodiment, the memory device 120 may perform the above various operations (e.g., the read operation and the program operation) by controlling voltages of the plurality of wordlines WL1 to WL8. When a specific operation is completed or is stopped, the memory device 120 performs an operation of controlling voltages of the plurality of wordlines WL1 to WL8 so as to be set to a given level (e.g., a recovery level), which is referred to as a "mode recovery operation". In the mode recovery operation, as levels of a plurality of wordlines decrease, negative boosting may be generated in channels of the first memory block BLK1; in this case, voltages or levels of the channels of the first memory block BLK1 may decrease. According to the above condition, the reliability of the memory cells of may be reduced by the electric field caused by a difference between the voltages of the plurality of wordlines WL1 to WL8 and the channel voltages.

According to embodiments of the present disclosure, in the mode recovery operation of the memory device 120, a voltage difference of the channels and the wordlines after the mode recovery operation may decrease by pre-charging a channel voltage through the bitline BL or the common source line CSL. In this case, the electric field caused by a voltage difference of the wordlines and the channels may decrease, and thus, the reliability of the memory cells may be improved.

Figure 5:
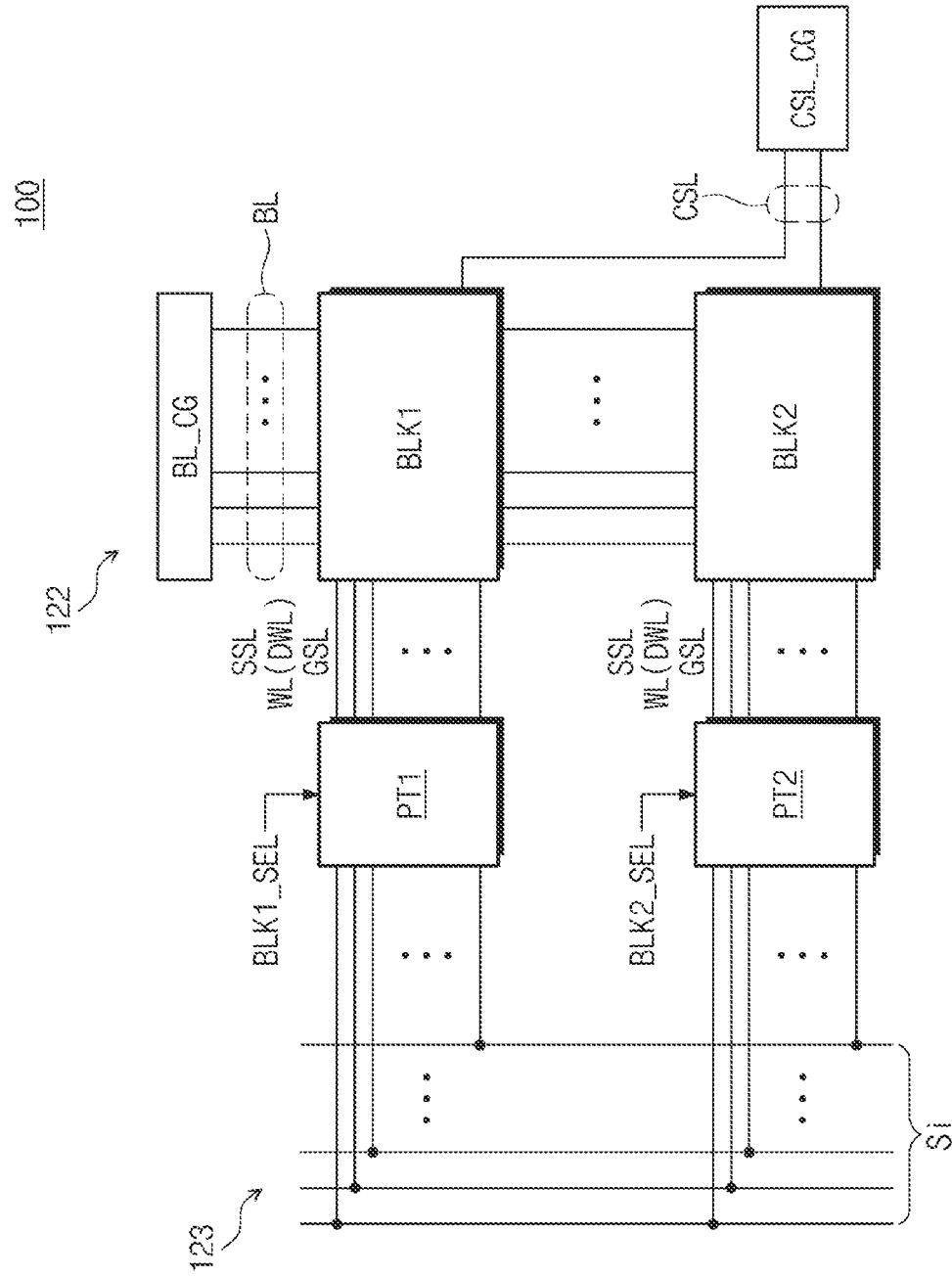
FIG. 5 is a block diagram illustrating some components (e.g., memory blocks and a part of an address decoder) of a memory device of FIG. 2.

FIG. 5 is a block diagram illustrating some components (e.g., memory blocks and a part of an address decoder) of a memory device of FIG. 2. Referring to FIGS. 2, 3, and 5, the memory cell array 122 of the memory device 120 may include the first memory block BLK1 and a second memory block BLK2. Each of the first and second memory blocks BLK1 and BLK2 may be connected with the string selection lines SSL, the wordlines WL, and the ground selection lines GSL. In an embodiment, the first and second memory blocks BLK1 and BLK2 may be connected in common with the bitlines BL.

The address decoder 123 may include first pass transistors PT1 and second pass transistors PT2. The address decoder 123 may control voltages of a plurality of driving lines Si for the purpose of controlling the string selection lines SSL, the wordlines WL, and the ground selection lines GSL connected with the first memory block BLK1 or the second memory block BLK2. The plurality of driving lines Si may be connected with the string selection lines SSL, the wordlines WL, and the ground selection lines GSL connected with the first memory block BLK1 or the second memory block BLK2 through the first pass transistors PT1 or the second pass transistors PT2.

For example, when the address ADDR received from the memory controller 110 indicates the first memory block BLK1 (i.e., when a selected memory block is the first memory block BLK1), a first block selection signal BLK1_SEL may be activated. In response to the first block selection signal BLK1_SEL, the first pass transistors PT1 may connect the plurality of driving lines Si with the string selection lines SSL, the wordlines WL, and the ground selection lines GSL connected with the first memory block BLK1. As such, the string selection lines SSL, the wordlines WL, and the ground selection lines GSL of the first memory block BLK1 may be controlled through the plurality of driving lines Si.

Alternatively, when the address ADDR received from the memory controller 110 indicates the second memory block BLK2 (i.e., when a selected memory block is the second memory block BLK2), a second block selection signal BLK2_SEL may be activated. In response to the second block selection signal BLK2_SEL, the second pass transistors PT2 may connect the plurality of driving lines Si with the string selection lines SSL, the wordlines WL, and the ground selection lines GSL connected with the second memory block BLK2. As such, the string selection lines SSL, the wordlines WL, and the ground selection lines GSL of the second memory block BLK2 may be controlled through the plurality of driving lines Si.

In an embodiment, the mode recovery operation may end when the first block selection signal BLK1_SEL or the second block selection signal BLK2_SEL switches from an active state to an inactive state (e.g., transitions from the high level to the low level).

In an embodiment, the plurality of bitlines BL may be connected with a bitline control gate BL_CG. The bitline control gate BL_CG may control voltages of the plurality of bitlines BL. In an embodiment, the first and second memory blocks BLK1 and BLK2 may be connected with the common source line CSL. The common source line CSL may be connected with a common source line control gate CSL_CG. The common source line control gate CSL_CG may control a voltage of the common source line CSL.

Figure 6:
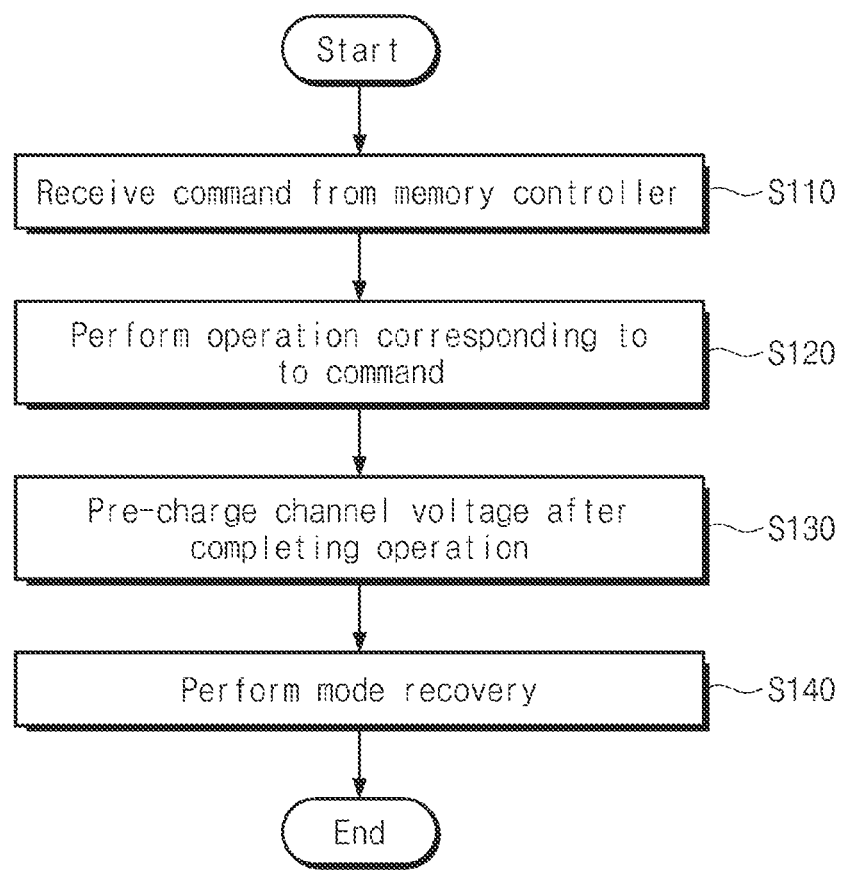
FIG. 6 is a flowchart illustrating an operation of a memory device of FIG. 2.

FIG. 6 is a flowchart illustrating an operation of a memory device of FIG. 2. Referring to FIGS. 2 and 6, in operation S110, the memory device 120 may receive the command CMD from the memory controller 110. For example, the memory device 120 may receive a read command for the read operation or a program command for the program operation from the memory controller 110.

In operation S120, the memory device 120 may perform an operation corresponding to the received command. For example, the memory device 120 may control lines (e.g., SSL, WL, and GSL) connected with a memory block corresponding to the address ADDR such that the operation corresponding the received command is performed. In detail, when the received command is the read command, the memory device 120 may perform the read operation by applying the read voltage to a wordline selected from the lines connected with the memory block corresponding to the address ADDR and applying a non-selection read voltage to unselected wordlines among the lines. Alternatively, when the received command is the program command, the memory device 120 may perform the program operation by applying the program voltage to a wordline selected from the lines connected with the memory block corresponding to the address ADDR and applying a pass voltage to unselected wordlines among the lines. The above operations are provided only as an example, and the present disclosure is not limited thereto.

After completing the operation corresponding to the received command, in operation S130, the memory device 120 may pre-charge a channel voltage. In operation S140, the memory device 120 may perform the mode recovery operation. For example, after completing the operation corresponding to the received command, the memory device 120 may pre-charge a channel of a selected memory block through the bitline BL or the common source line CSL. Afterwards, the memory device 120 may control voltages of a plurality of wordlines so as to be set to a given voltage (e.g., a recovery voltage) and may then deactivate a block selection signal. In this case, even though the negative boosting is generated in a channel of the selected memory block, a voltage difference of the plurality of wordlines and the channel may decrease at a time when the voltages of the plurality of wordlines reach the given voltage (or the recovery voltage). As such, the reliability of the memory cells may be improved.

In an embodiment, to describe embodiments of the present disclosure easily, the description is given as the operation of pre-charging the channel voltage and the mode recovery operation are performed independently of each other, but the present disclosure is not limited thereto. For example, a memory device may start to pre-charge the channel voltage at a time when the mode recovery operation starts and may maintain the pre-charging of the channel voltage until a specific time (e.g., until a voltage of a string selection line is lower than a threshold voltage of a string selection transistor).

Figure 7:
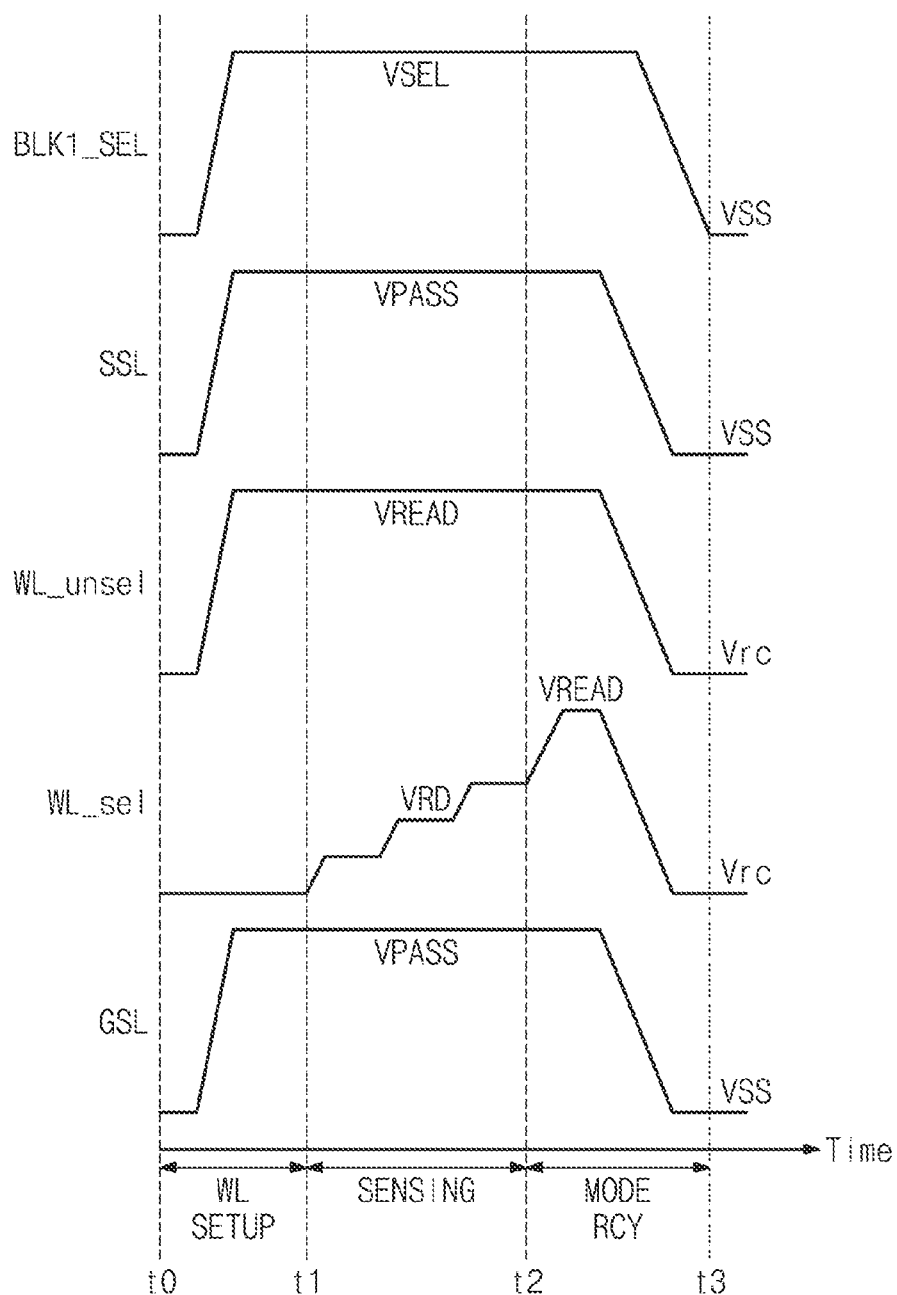
FIG. 7 is a timing diagram for describing a read operation of a memory device of FIG. 2.

FIG. 7 is a timing diagram for describing a read operation of a memory device of FIG. 2. In FIG. 7, a horizontal axis represents time and a vertical axis represents a voltage level of each line. For convenience of description, it is assumed that the first memory block BLK1 is a selected memory block and one of a plurality of wordlines included in the first memory block BLK1 is a selected wordline WL_sel. In the following timing diagrams, the string selection line SSL may refer to a string selection line selected from a plurality of string selection lines connected with the first memory block BLK1.

Below, the terms "channel", "channel voltage", etc. are used. The term "channel" may mean a structure or an electrical path that electrically connects cell transistors of a cell string included in the first memory block BLK1. The term "channel voltage" may mean an electrical potential of the channel.

Referring to FIGS. 2, 3, 6, and 7, the memory device 120 may perform the read operation in response to the read command received from the memory controller 110. For example, the memory device 120 may perform the read operation by performing a wordline setup operation WL SETUP, a sensing operation SENSING, and a mode recovery operation MODE RCY.

In detail, as illustrated in FIG. 7, the memory device 120 may perform the wordline setup operation WL SETUP during a time period from t0 to t1. For example, in the wordline setup operation WL SETUP, a selection voltage VSEL may be applied to a line for the first block selection signal BLK1_SEL. The selection voltage VSEL may be a high voltage sufficient to turn on the first pass transistors PT1 described with reference to FIG. 5. As the first pass transistors PT1 are turned on, the driving lines Si may be connected with the lines (e.g., SSL, WL, and GSL) of the first memory block BLK1; in this case, voltages of the lines (e.g., SSL, WL, and GSL) of the first memory block BLK1 may be controlled by controlling the driving lines Si, which will be described below.

In the wordline setup operation WL SETUP, a pass voltage VPASS may be applied to the string selection lines SSL, a non-selection read voltage VREAD may be applied to unselected wordlines WL_unsel, and the pass voltage VPASS may be applied to the ground selection lines GSL.

In an embodiment, the pass voltage VPASS and the non-selection read voltage VREAD may be a high voltage sufficient to turn on corresponding cell transistors regardless of states (e.g., threshold voltage levels) of corresponding cell transistors (e.g., SST, MC, and GST). In an embodiment, the pass voltage VPASS and the non-selection read voltage VREAD that are provided to the string selection lines SSL, the unselected wordlines WL_unsel, and the ground selection lines GSL may have various levels depending on locations or characteristics of corresponding lines or corresponding cell transistors.

For example, a non-selection read voltage that is applied to unselected wordlines adjacent to the selected wordline WL_sel may be different from or higher than a non-selection read voltage that is applied to the remaining unselected wordlines. Alternatively, the pass voltage VPASS that is applied to the string selection lines SSL and the ground selection lines GSL may be different from the non-selection read voltage VREAD that is applied to the unselected wordlines WL_unsel. Alternatively, the pass voltage VPASS that is applied to the string selection lines SSL may be different from the pass voltage VPASS that is applied to the ground selection lines GSL. It may be understood that a voltage level difference of lines is variously changed.

In an embodiment, before the pass voltage VPASS is applied to the string selection lines SSL, the level of the string selection lines SSL may be a ground voltage VSS. Before the pass voltage VPASS is applied to the ground selection lines GSL, the level of the ground selection lines GSL may be the ground voltage VSS. Before the non-selection read voltage VREAD is applied to the unselected wordlines WL_unsel, the level of the unselected wordlines WL_unsel may be a recovery voltage Vrc. In an embodiment, the recovery voltage Vrc may be higher than the ground voltage VSS.

Next, the memory device 120 may perform the sensing operation SENSING during a time period from t1 to t2. For example, the first block selection signal BLK1_SEL may maintain the selection voltage VSEL, the string selection lines SSL may maintain the pass voltage VPASS, the unselected wordlines WL_unsel may maintain the non-selection read voltage VREAD, and the ground selection lines GSL may maintain the pass voltage VPASS.

During the sensing operation SENSING, the read voltages VRD may be sequentially applied to the selected wordline WL_sel. In an embodiment, during the sensing operation SENSING, the read voltages VRD that are applied to the selected wordline WL_sel may include at least one of the plurality of read voltages VRD1 to VRD7 described with reference to FIG. 3. During the sensing operation SENSING, the read voltages VRD that are applied to the selected wordline WL_sel may be determined depending on a corresponding page or bit ordering.

Program states of the memory cells connected with the selected wordline WL_sel may be determined through the sensing operation SENSING described above. That is, data stored in the memory cells connected with the selected wordline WL_sel may be completely read through the sensing operation SENSING.

Afterwards, the memory device 120 may perform the mode recovery operation MODE RCY. The mode recovery operation MODE RCY may indicate an operation of setting or controlling the plurality of wordlines to a given level (e.g., the recovery voltage Vrc) after the operation corresponding to the command received from the memory controller 110 is completed.

As illustrated in FIG. 7, the memory device 120 may perform the mode recovery operation MODE RCY during a time period from t2 to t3. For example, in the mode recovery operation MODE RCY, the voltage of the selected wordline WL_sel may increase to the non-selection read voltage VREAD. As such, all the memory cells connected with the selected wordline WL_sel may be turned on.

Afterwards, the first block selection signal BLK1_SEL may decrease from the selection voltage VSEL to the ground voltage VSS, the string selection lines SSL may decrease from the pass voltage VPASS to the ground voltage VSS, the unselected wordlines WL_unsel and the selected wordline WL_sel may decrease from the non-selection read voltage VREAD to the recovery voltage Vrc, and the ground selection lines GSL may decrease from the pass voltage VPASS to the ground voltage VSS. The plurality of wordlines (i.e., WL_unsel and WL_sel) may be set with the recovery voltage Vrc through the mode recovery operation MODE RCY described above. After the mode recovery operation MODE RCY is completed, the memory device 120 may perform a next operation (e.g., a next read operation or a next program operation). In an embodiment, after the mode recovery operation MODE RCY is completed, the wordlines WL_unsel and WL_sel connected with the first memory block BLK1 may be floated.

In an embodiment, in the mode recovery operation MODE RCY, when the voltages of the string selection lines SSL are lower than the threshold voltages of the string selection transistors SST, the string selection transistors SST may be turned off; in this case, the channels of the first memory block BLK1 may be localized. According to the above condition, because the voltages of the wordlines WL_unsel and WL_sel are continuously decreasing, the decrease in the voltages of the wordlines WL_unsel and WL_sel may cause the negative boosting of the localized channels. In this case, after the mode recovery operation MODE RCY is completed, a difference between voltages of wordlines (e.g., WL_unsel and WL_sel) and channel voltages may occur, thereby reducing the reliability of memory cells.

Figure 8A:
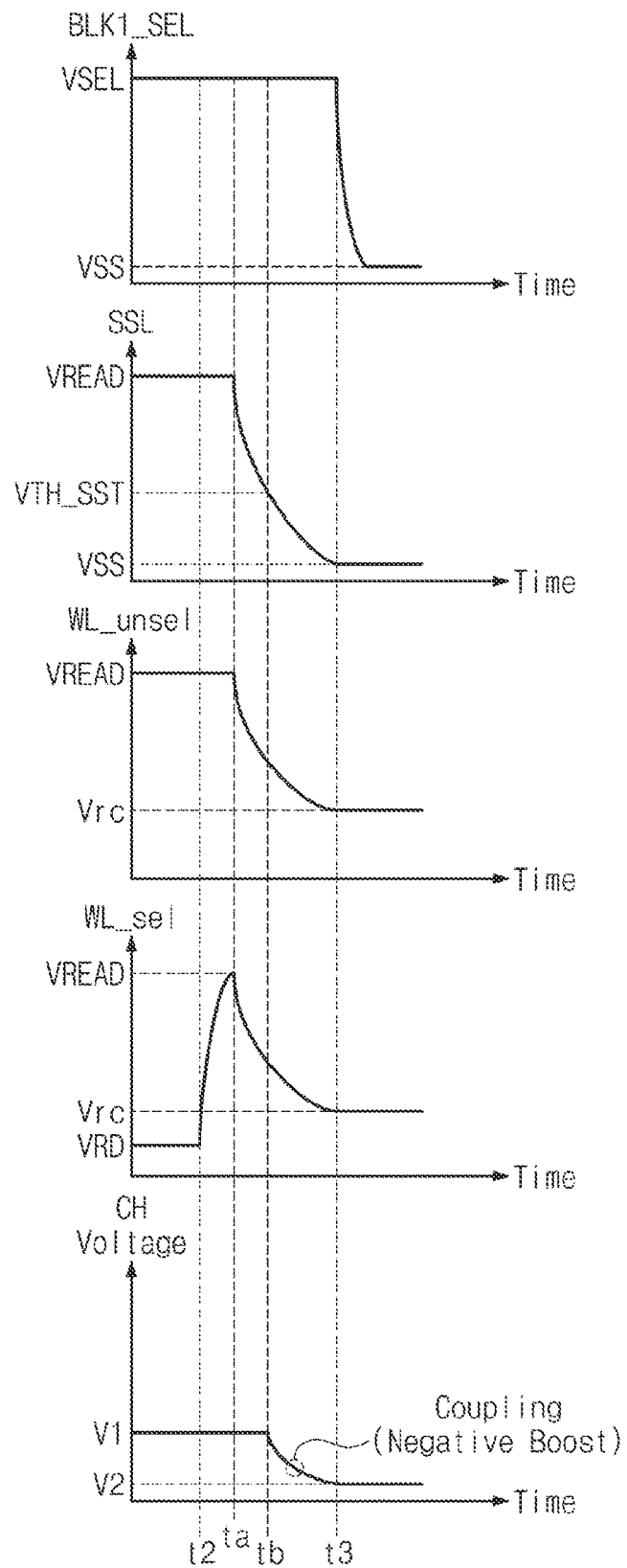
FIGS. 8A and 8B are timing diagrams illustrating a mode recovery operation of FIG. 7 in detail.
Figure 8B:
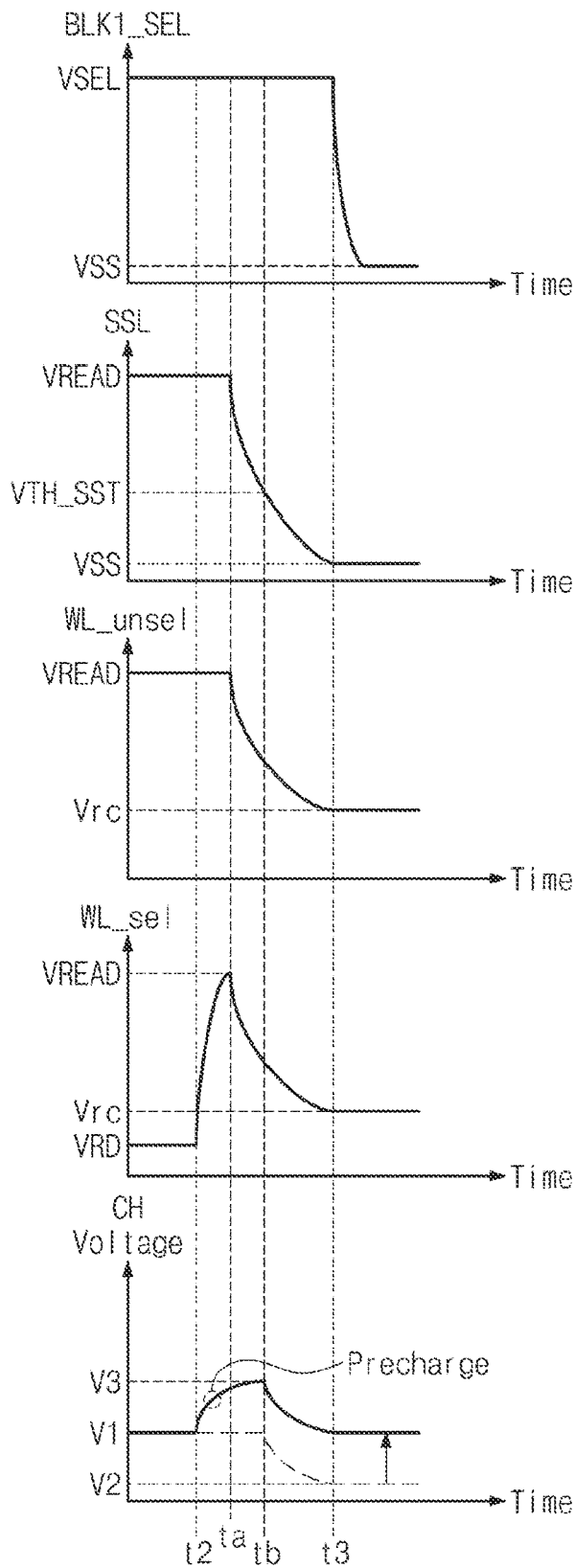

FIGS. 8A and 8B are timing diagrams illustrating a mode recovery operation of FIG. 7 in detail. In FIGS. 8A and 8B, a horizontal axis represents time and a vertical axis represents voltages of corresponding lines.

Referring to FIGS. 2, 3, 7, 8A, and 8B, the memory device 120 may perform the mode recovery operation MODE RCY in a time period from t2 to t3. In an embodiment, operations (e.g., the wordline setup operation WL SETUP and the sensing operation SENSING) before the second time t2 are described with reference to FIG. 7, and thus, additional description will be omitted to avoid redundancy.

In a time period from t2 to ta, the selection read voltage VRD of the selected wordline WL_sel may reach the non-selection read voltage VREAD at the a-th time ta. Afterwards, from the a-th time ta, the voltages of the string selection lines SSL and the plurality of wordlines WL_unsel and WL_sel may start to decrease.

When the voltages of the respective lines SSL, WL_unsel, and WL_sel reach a target level (i.e., at a third time t3), the selection voltage VSEL of the first block selection signal BLK1_SEL may decrease to the ground voltage VSS and, thus, the first pass transistors PT1 may be turned off. After the first pass transistors PT1 are turned off, the memory device 120 may further perform a next operation.

As illustrated in FIG. 8A, at a b-th time tb, the voltage of the string selection line SSL may be lower than a threshold voltage VTH_SST of the string selection transistor SST. In this case, at the b-th time tb, the string selection transistor SST may be turned off. After the b-th time tb, the coupling of the channel CH may be made by the voltage drop of the plurality of wordlines WL_unsel and WL_sel; in this case, a channel voltage may be negatively boosted from a first voltage V1 to a second voltage V2. At the third time t3, the string selection lines SSL may reach the ground voltage VSS, and the wordlines WL_unsel and WL_sel may reach the recovery voltage Vrc. In this case, the channel CH may have the second voltage V2 lower than the first voltage V1. According to the above description, after the mode recovery operation MODE RCY is completed, a channel voltage may be low, which causes a difference between the channel voltage and the wordline voltages. The voltage difference may cause the reduction of reliability of memory cells.

In contrast, as illustrated in FIG. 8B, at the second time t2, the channel CH that retains the first voltage V1 may be pre-charged with a channel voltage being a third voltage V3 higher than the first voltage V1. In an embodiment, the operation of pre-charging the channel voltage (i.e., the channel pre-charge operation) may be performed during a time period from the second time t2 when the mode recovery operation MODE RCY starts to a time (i.e., the b-th time tb) when the voltage of the string selection line SSL is lower than the threshold voltage VTH_SST of the string selection transistor SST. In an embodiment, the third voltage V3 (i.e., the channel pre-charge voltage or the channel voltage) may be equal in level to the non-selection read voltage VREAD provided to the unselected wordline WL_unsel or may be equal to or lower than an upper limit value or a lower limit value of the uppermost program state (e.g., P7) among the program states P1 to P7 of the memory cells.

In this case, after the b-th time tb, even though the negative boosting is generated at the channel CH by the voltage drop of the wordlines WL_unsel and WL_sel, after the mode recovery operation MODE RCY is completed, a voltage difference of the wordlines WL_unsel and WL_sel and the channel CH may decrease compared to the embodiment of FIG. 8A. As such, the reduction of reliability of the memory cells may be prevented.

Figure 9:
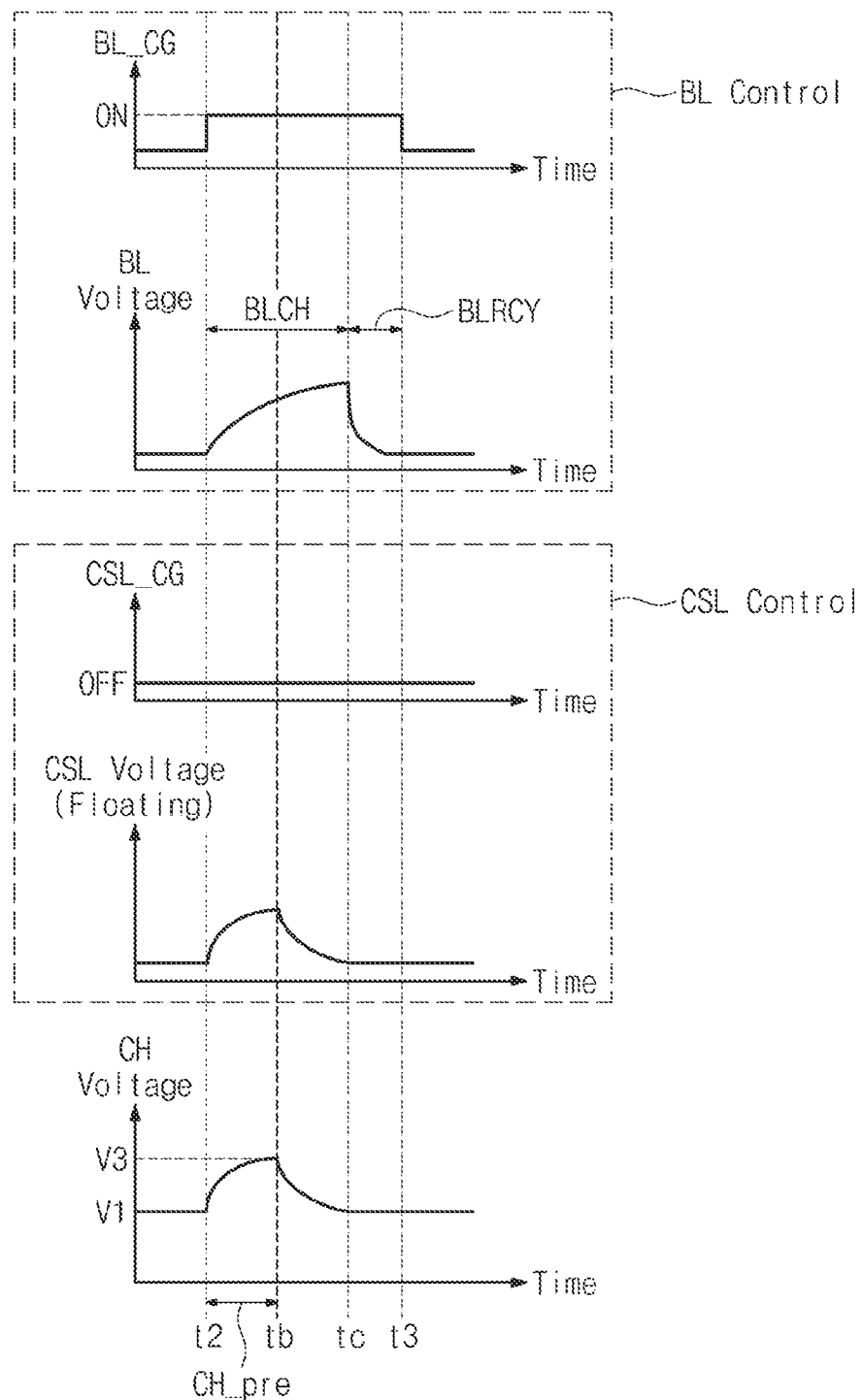
FIGS. 9 to 11 are timing diagrams for describing a channel pre-charge operation.
Figure 10:
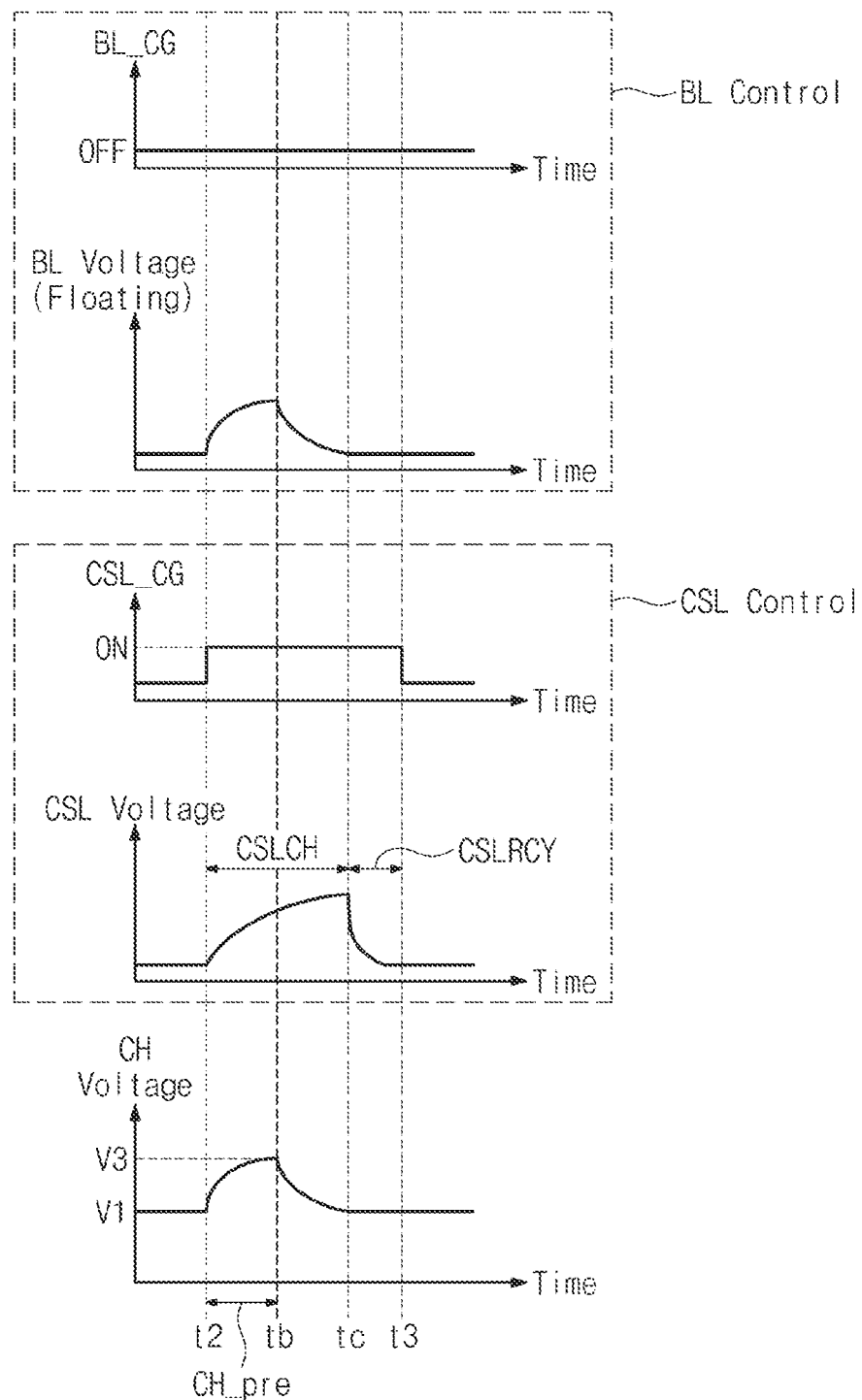
Figure 11:
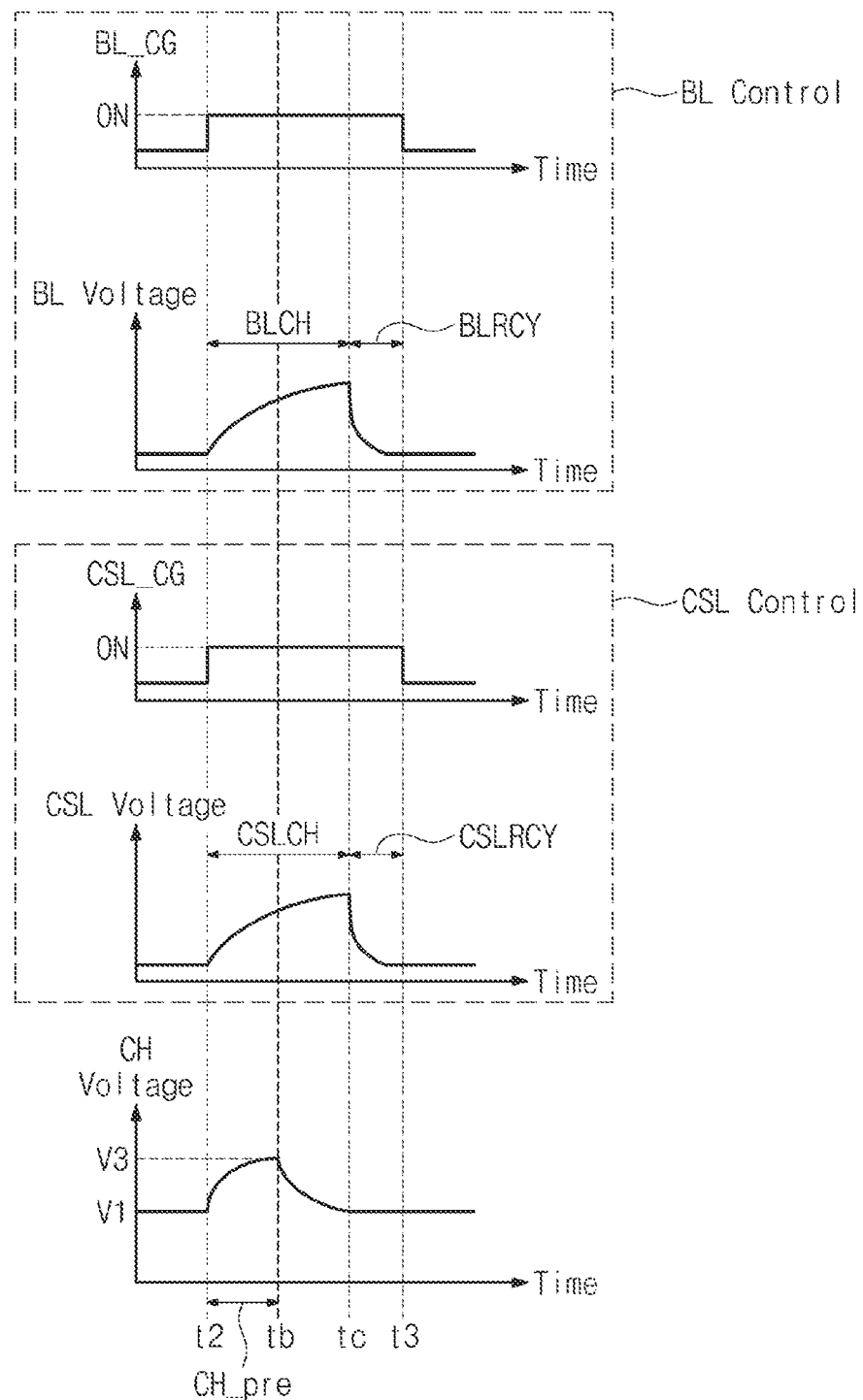

FIGS. 9 to 11 are timing diagrams for describing a channel pre-charge operation. In an embodiment, in the mode recovery operation MODE RCY, the operation of pre-charging the channel CH (i.e., the channel pre-charge operation) may be performed by controlling the bitline BL, the common source line CSL, and both the bitline BL and the common source line CSL.

First, referring to FIGS. 2, 3, 5, 8B, and 9, in the mode recovery operation MODE RCY, the memory device 120 may pre-charge the channel CH by controlling the bitline BL. For example, the bitline control gate BL_CG may be turned on at the second time t2 when the mode recovery operation MODE RCY starts. As such, a voltage of the bitline BL may increase.

At the second time t2, because the cell transistors SST and MC connected with the string selection line SSL and the wordlines WL_unsel and WL_sel are in a turn-on state, the channel CH may be pre-charged by the voltage of the bitline BL.

At the b-th time tb, the string selection transistor SST may be turned off. In this case, the channel CH may be localized or floated. According to the above condition, the negative boosting may be generated by the voltage drop of the wordlines WL_unsel and WL_sel.

In an embodiment, the bitline BL may be charged during a period longer than a substantial channel pre-charge period CH_pre. For example, in a period where the bitline control gate BL_CG is turned on, the bitline BL may be charged during a time period from t2 to tc (i.e., during a time period BLCH). Afterwards, during a time period from tc to t3, a recovery operation BLRCY may be performed on the bitline BL (e.g., an operation of discharging the bitline BL may be performed).

In the embodiment of FIG. 9, in the case where the channel CH is pre-charged by controlling the bitline BL, the common source line control gate CSL_CG may be turned off such that the common source line CSL is floated. The floated common source line CSL may have a voltage similar in level, to the channel voltage.

Next, referring to FIGS. 2, 3, 5, 8B, and 10, in the mode recovery operation MODE RCY, the memory device 120 may pre-charge the channel CH by controlling the common source line CSL. For example, the common source line control gate CSL_CG may be turned on at the second time t2 when the mode recovery operation MODE RCY starts. As such, a voltage of the common source line CSL may increase.

At the second time t2, because the cell transistors GST and MC connected with the ground selection line GSL and the wordlines WL_unsel and WL_sel are in a turn-on state, the channel CH may be pre-charged by the voltage of the common source line CSL.

At the b-th time tb, a voltage of the ground selection line GSL may be lower than a threshold voltage of the ground selection transistor GST and, thus, the ground selection transistor GST may be turned off. In this case, the channel CH may be localized or floated. According to the above condition, the negative boosting may be generated by the voltage drop of the wordlines WL_unsel and WL_sel.

In an embodiment, the common source line CSL may be charged during a period longer than the substantial channel pre-charge period CH_pre. For example, in a period where the common source line control gate CSL_CG is turned on, the common source line CSL may be charged during a time period from t2 to tc (i.e., during a time period CSLCH). Afterwards, during a time period from tc to t3, a recovery operation CSLRCY may be performed on the common source line CSL (e.g., an operation of discharging the common source line CSL may be performed).

In the embodiment of FIG. 10, in the case where the channel CH is pre-charged by controlling the common source line CSL, the bitline control gate BL_CG may be turned off such that the bitline BL is floated. The floated bitline BL may have a voltage similar in level to the channel voltage.

Next, referring to FIGS. 2, 3, 5, 8B, and 11, in the mode recovery operation MODE RCY, the memory device 120 may pre-charge the channel CH by controlling both the bitline BL and the common source line CSL. For example, at the second time t2 when the mode recovery operation MODE RCY starts, the bitline control gate BL_CG may be turned on and the common source line control gate CSL_CG may be turned on. As such, a voltage of the bitline BL and a voltage of the common source line CSL may increase.

At the second time t2, because the cell transistors SST, GST, and MC connected with the string selection line SSL, the ground selection line GSL, and the wordlines WL_unsel and WL_sel are in a turn-on state, the channel CH may be pre-charged by a voltage of the bitline BL and a voltage of the common source line CSL.

At the b-th time tb, the string selection transistor SST and the ground selection transistor GST may be turned off. In this case, the channel CH may be localized or floated.

According to the above condition, the negative boosting may be generated by the voltage drop of the wordlines WL_unsel and WL_sel.

In an embodiment, the bitline BL and the common source line CSL may be charged during a period longer than the substantial channel pre-charge period CH_pre. For example, in a period where the bitline control gate BL_CG is turned on, the bitline BL may be charged during a time period from t2 to tc (i.e., during a time period BLCH). Afterwards, during a time period from tc to t3, the recovery operation BLRCY may be performed on the bitline BL (e.g., the operation of discharging the bitline BL may be performed). In a period where the common source line control gate CSL_CG is turned on, the common source line CSL may be charged during a time period from t2 to tc (i.e., during the time period CSLCH). Afterwards, during a time period from tc to t3, the recovery operation CSLRCY may be performed on the common source line CSL (e.g., the operation of discharging the common source line CSL may be performed).

As described above, the memory device 120 may pre-charge the channel CH with a given level, by controlling the bitline BL, the common source line CSL, or both the bitline BL and the common source line CSL in the mode recovery operation MODE RCY. As such, in the mode recovery operation MODE RCY, even though the negative boosting is generated in the channel CH, because the final voltage difference of the channel CH and the wordline decreases, the reliability of memory cells may be improved.

In an embodiment, the channel pre-charge operation described with reference to FIGS. 9 to 11 is provided only as an example, and the present disclosure is not limited thereto. For example, in the operation method of FIGS. 9 to 11, the bitline recovery operation BLRCY or the common source line recovery operation CSLRCY may be omitted.

For example, when the bitline recovery operation BLRCY is omitted, after the bitline charging period BLCH passes, a leakage current flowing to the string selection line SSL may decrease. In this case, the bitline BL may be floated by turning off the bitline control gate BL_CG in a state where the bitline recovery operation BLRCY is omitted and the bitline BL is charged.

When the common source line recovery operation CSLRCY is omitted, after the common source line charging period CSLCH passes, a leakage current flowing to the ground selection line GSL may decrease. In this case, the common source line CSL may be floated by turning off the common source line control gate CSL_CG in a state where the common source line recovery operation CSLRCY is omitted and the common source line CSL is charged.

In an embodiment, the pre-charge level and the pre-charge period of the channel CH may be variously set and controlled. For example, the description is given with reference to FIGS. 9 to 11 as the bitline control gate BL_CG or the common source line control gate CSL_CG is turned on at a time (e.g., the second time t2) when the mode recovery operation MODE RCY starts. However, the present disclosure is not limited thereto. For example, the start time point at which the bitline control gate BL_CG or the common source line control gate CSL_CG is turned on to precharge the channel CH may be variously changed or modified. Alternatively, a voltage level that is provided to the bitline BL or the common source line CSL when the bitline control gate BL_CG or the common source line control gate CSL_CG is turned on may be variously changed or modified. That is, in the case where the pre-charge level (i.e., target level) of the channel CH is a first level, a voltage that is provided to the bitline BL or the common source line CSL may be a second level; in the case where the pre-charge level (i.e., target level) of the channel CH is a third level lower than the first level, a voltage that is provided to the bitline BL or the common source line CSL may be a fourth level lower than the second level. Alternatively, a rising slope of the voltage level that is provided to the bitline BL or the common source line CSL when the bitline control gate BL_CG or the common source line control gate CSL_CG is turned on may be variously changed or modified. Alternatively, a level of a control signal for turning on the bitline control gate BL_CG or the common source line control gate CSL_CG may be variously changed or modified.

As described above, the pre-charge level of the channel CH may be variously set by variously adjusting the timing or level of signals for controlling the bitline BL and the common source line CSL or the level and rising slope of the voltage applied to the bitline BL and the common source line CSL.

Figure 12:
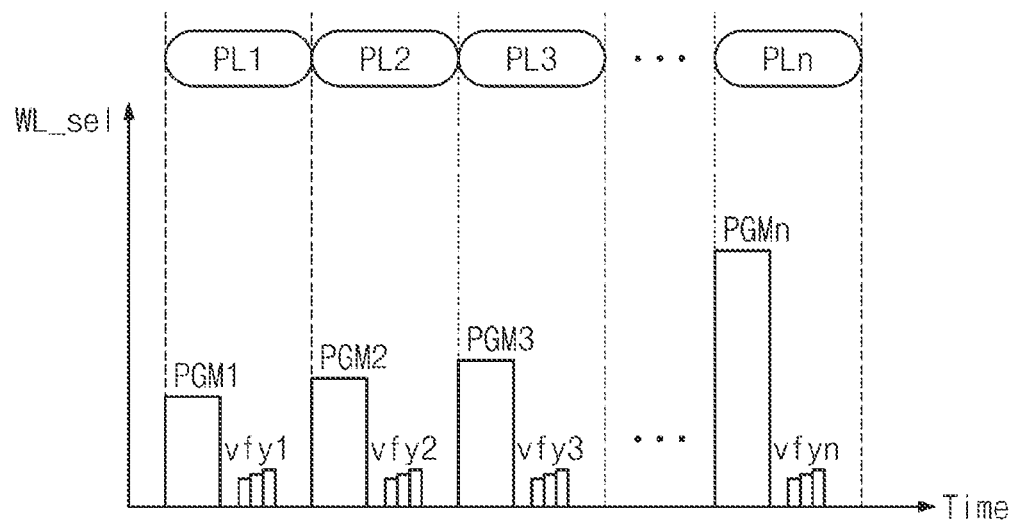
FIG. 12 is a timing diagram illustrating a program operation of a memory device of FIG. 2.

FIG. 12 is a timing diagram illustrating a program operation of a memory device of FIG. 2. Referring to FIGS. 2, 3, and 12, the memory device 120 may perform the program operation in response to the program command received from the memory controller 110.

The memory device 120 may perform the program operation based on an incremental step pulse programming (ISPP) scheme. For example, the memory device 120 may perform the program operation through a plurality of program loops PL1 to PLn. Each of the plurality of program loops PL1 to PLn may include a program step and a verify step. The program step refers to an operation of varying threshold voltages of corresponding memory cells among memory cells connected with the selected wordline WL_sel by applying the program voltage to the selected wordline WL_sel, and the verify step refers to an operation of verifying whether the corresponding memory cells have a target program state by applying a verification voltage to the selected wordline WL_sel.

For example, in the first program loop PL1, the memory device 120 may apply a first program voltage PGM1 to the selected wordline WL_sel. Afterwards, in the first program loop PL1, the memory device 120 may verify program states of the memory cells connected with the selected wordline WL_sel by applying verification voltages vfy1 to the selected wordline WL_sel.

In the first program loop PL1, when a program verification result indicates program fail, the memory device 120 performs the second program loop PL2. In the second program loop PL2, the memory device 120 may apply a second program voltage PGM2 to the selected wordline WL_sel. Afterwards, the memory device 120 may verify program states of the memory cells connected with the selected wordline WL_sel by applying verification voltages vfy2 to the selected wordline WL_sel.

In the second program loop PL2, when a program verification result indicates program fail, the memory device 120 performs the third program loop PL3. In the third program loop PL3, the memory device 120 may apply a third program voltage PGM3 to the selected wordline WL_sel. Afterwards, the memory device 120 may verify program states of the memory cells connected with the selected wordline WL_sel by applying verification voltages vfy3 to the selected wordline WL_sel.

The memory device 120 may perform the above operation until a current program loop reaches the n-th program loop PLn. In the n-th program loop PLn, the memory device 120 may apply an n-th program voltage PGMn to the selected wordline WL_sel. Afterwards, the memory device 120 may verify program states of the memory cells connected with the selected wordline WL_sel by applying verification voltages Vfyn to the selected wordline WL_sel.

In an embodiment, the program voltage may be increased as much as a given level (or increment) whenever the program loop is repeated. For example, the second program voltage PGM2 may be higher than the first program voltage PGM1 as much as the given level (or increment). The third program voltage PGM3 may be higher than the second program voltage PGM2 as much as the given level (or increment). In an embodiment, the increment of the program voltage that increases as the program loop is repeated may be variously changed or modified.

In an embodiment, each of the verification voltage sets vfy1 to vfyn that are applied for respective program loops may include at least one of the plurality of verification voltages Vvfy1 to Vvfy7 described with reference to FIG. 3. Each of the verification voltage sets vfy1 to vfyn that are applied for respective program loops may be composed of the same verification voltages or different verification voltages depending on a target program state of memory cells.

In an embodiment, while each of the program voltages PGM1 to PGMn is applied to the selected wordline WL_sel, a pass voltage may be applied to the unselected wordlines WL_unsel. In an embodiment, the verification voltages vfy may be applied to the selected wordline WL_sel, and the non-selection read voltage VREAD may be applied to the unselected wordlines WL_unsel.

In an embodiment, after the n-th program loop PLn is completed, the memory device 120 may complete or terminate the program operation. Alternatively, when a program verification result indicates program pass (i.e., when all the memory cells are normally programmed) in a current program loop, the memory device 120 may complete or stop the program operation of the current program loop. After the program operation, the memory device 120 may perform the mode recovery operation.

Figure 13:
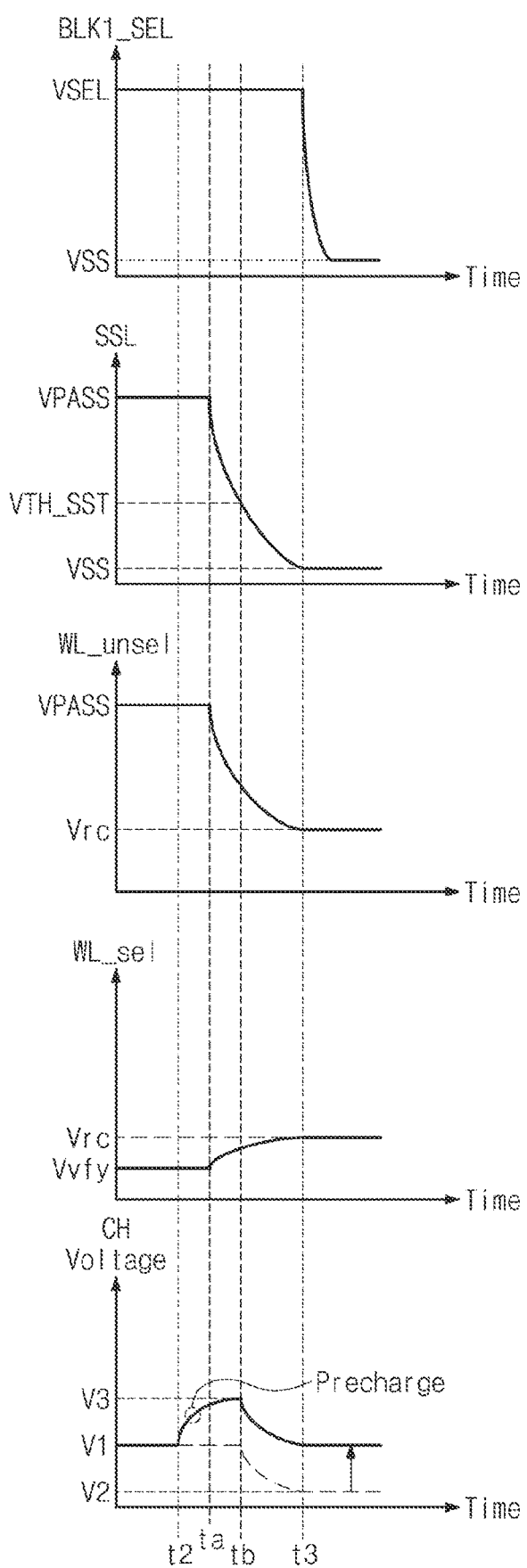
FIGS. 13 and 14 are timing diagrams for describing an operation of a memory device of FIG. 2.
Figure 14:
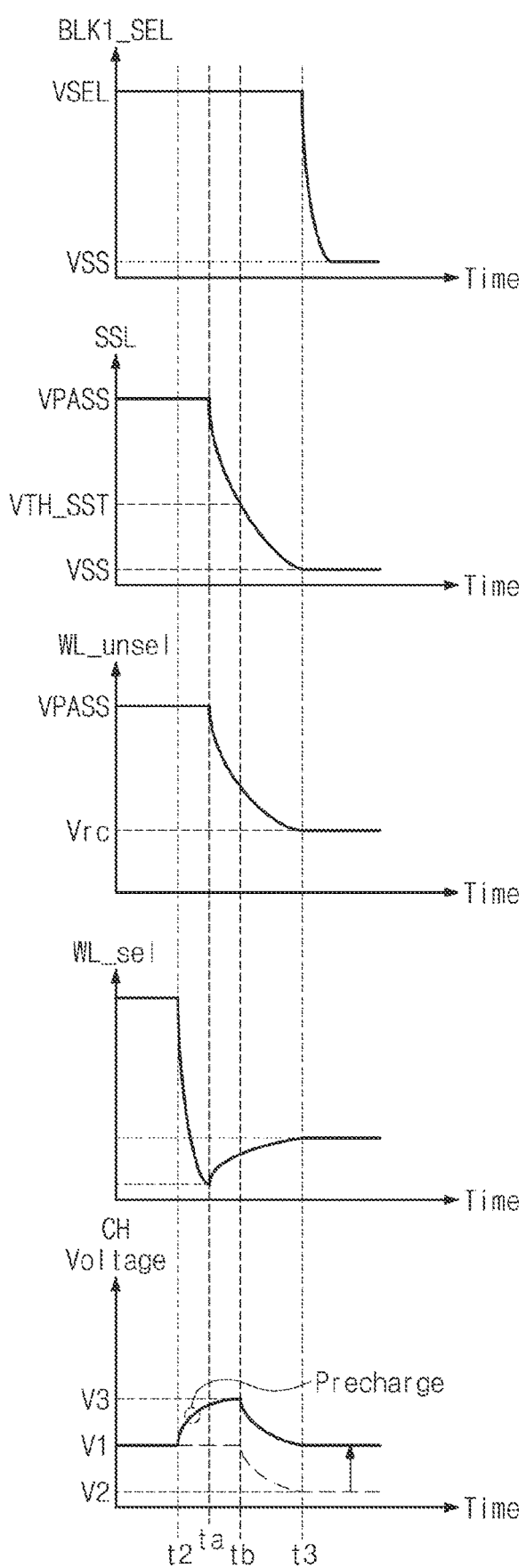

FIGS. 13 and 14 are timing diagrams for describing an operation of a memory device of FIG. 2. In FIGS. 13 and 14, the horizontal axis represents time and a vertical axis represents voltages of corresponding lines. How to perform the mode recovery operation after the memory device 120 performs the program operation will be described with reference to FIGS. 13 and 14. For example, the memory device 120 may perform the program operation based on the method described with reference to FIG. 12. In this case, when a program verification result indicates that memory cells reach to a target program state, the memory device 120 may stop or terminate the program operation. In this case, the memory device 120 may terminate the program operation and may perform the mode recovery operation MODE RCY such that the plurality of wordlines WL_sel and WL_unsel are set with the recovery voltage Vrc. In an embodiment, the recovery voltage Vrc may be higher than the ground voltage.

In an embodiment, as the program operation is stopped or terminated, the mode recovery operation MODE RCY may be performed after the program step of a specific program loop or after the verify step of the specific program loop.

First, referring to FIGS. 2, 3, 12, and 13, the memory device 120 may perform the mode recovery operation after the verify step. For example, as illustrated in FIG. 13, at the second time t2 when the mode recovery operation starts, the channel CH may be pre-charged.

Afterwards, in a time period from ta to t3, the verification voltage Vvfy of the selected wordline WL_sel may increase to the recovery voltage Vrc, the pass voltage VPASS of the unselected wordlines WL_unsel may decrease to the recovery voltage Vrc, and the pass voltage VPASS of the string selection line SSL may decrease to the ground voltage VSS. In this case, as in the above description, the string selection transistor SST may be turned off at the b-th time tb and the channel CH may be negatively boosted during a time period from tb to t3. Afterwards, the selection voltage VSEL of the first block selection signal BLK1_SEL may decrease to the ground voltage VSS.

The operation of FIG. 13 is similar to the mode recovery operation in the read operation described with reference to FIG. 8B except that the levels of the selected wordline WL_sel is different and, thus, additional description will be omitted to avoid redundancy. In an embodiment, in the embodiment of FIG. 13, the operation of pre-charging the channel CH may be performed based on the method described with reference to FIG. 9, 10, or 11.

Next, referring to FIGS. 2, 3, 12, and 14, the memory device 120 may perform the mode recovery operation after the program step. For example, as illustrated in FIG. 14, at the second time t2 when the mode recovery operation starts, the channel CH may be pre-charged.

In a time period from t2 to ta, the program voltage PGM of the selected wordline WL_sel may decrease to the ground voltage VSS. An operation after the a-th time ta is similar to that described with reference to FIG. 13, and thus, additional description will be omitted to avoid redundancy.

As described above, according to embodiments of the present disclosure, the memory device 120 may perform an operation (e.g., a read operation or a program operation) corresponding to a command received from the memory controller 110. After completing the corresponding operation, the memory device 120 may perform the mode recovery operation. The mode recovery operation may refer to an operation in which voltages of a plurality of wordlines are set to a given level (e.g., the recovery voltage Vrc). The memory device 120 may pre-charge a channel with a given level at a time when the mode recovery operation starts. After the mode recovery operation is completed, a voltage difference between wordlines and channels may relatively decrease, and thus, the reliability of memory cells may be improved.

Figure 15:
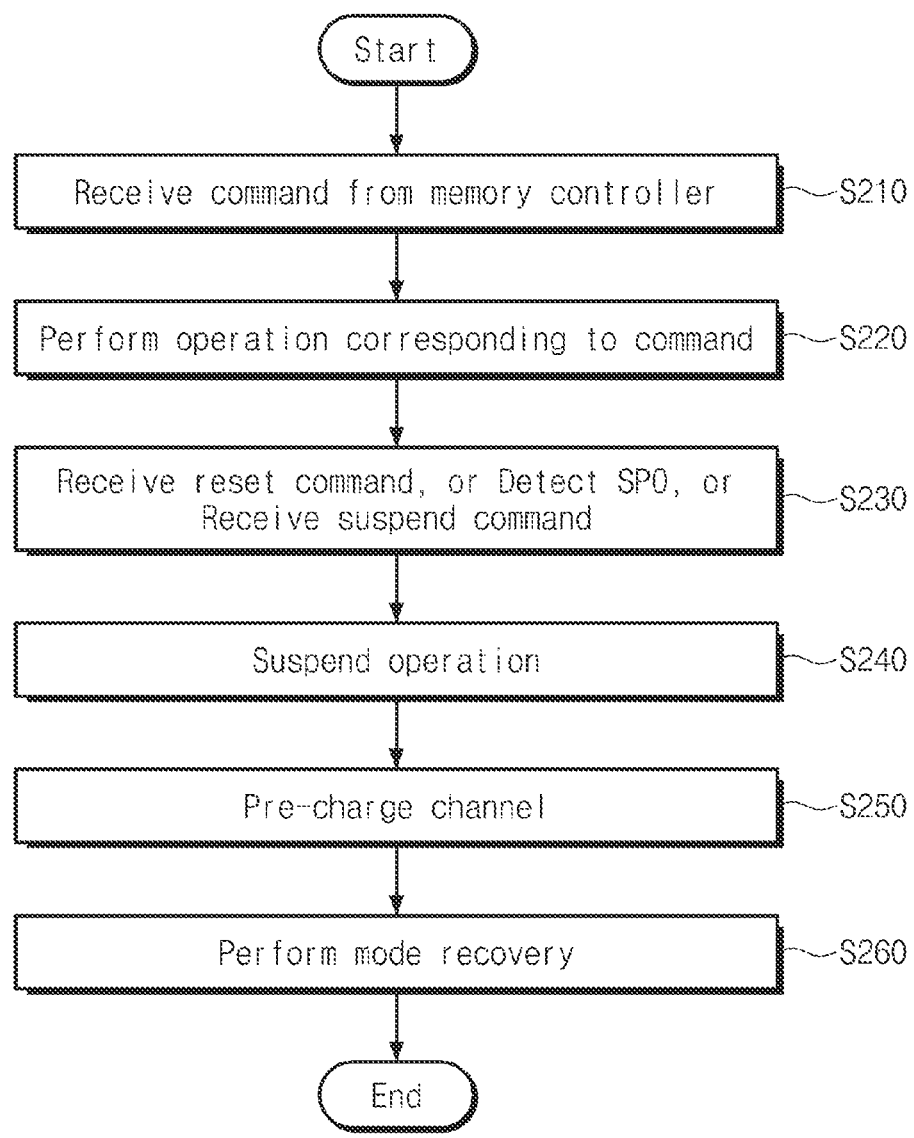
FIG. 15 is a flowchart for describing an operation of a memory device of FIG. 2.

FIG. 15 is a flowchart for describing an operation of a memory device of FIG. 2. Referring to FIGS. 2 and 15, the memory device 120 may perform operation S210 and operation S220. Operation S210 and operation S220 are similar to operation S110 and operation S120 of FIG. 6, and thus, additional description will be omitted to avoid redundancy.

In operation S230, the memory device 120 may receive a reset command from the memory controller 110, may detect a sudden power-off (SPO) event, or may receive a suspend command from the memory controller 110. For example, while the memory device 120 performs an operation corresponding to the received command, the memory device 120 may receive the reset command for a reset operation from the memory controller 110. Alternatively, while the memory device 120 performs an operation corresponding to the received command, the memory device 120 may detect the sudden power-off (SPO) event. In an embodiment, the sudden power-off (SPO) event may be detected by a voltage detection circuit included in the memory device 120 or may be detected based on explicit information from the memory controller 110. Alternatively, while the memory device 120 performs an operation corresponding to the received command, the memory device 120 may receive the suspend command for suspending an operation being performed, from the memory controller 110.

In operation S240, the memory device 120 may suspend the operation being performed in response to the command received in operation S230 or the information detected in operation S230. Afterwards, the memory controller 110 may perform operation S250 and operation S260. Operation S250 and operation S260 are similar to operation S130 and operation S140 of FIG. 6, and thus, additional description will be omitted to avoid redundancy.

In an embodiment, when the suspended operation is the read operation, based on the method described with reference to FIG. 8B, the memory device 120 may pre-charge the channel and may perform the mode recovery operation. Alternatively, when the suspended operation is the program operation and is suspended in the verify step, based on the method described with reference to FIG. 13, the memory device 120 may pre-charge the channel and may perform the mode recovery operation. Alternatively, when the suspended operation is the program operation and is suspended in the program step, based on the method described with reference to FIG. 14, the memory device 120 may pre-charge the channel and may perform the mode recovery operation.

In an embodiment, the channel pre-charge operation may be performed based on the method described with reference to FIG. 9, 10, or 11.

Figure 16:
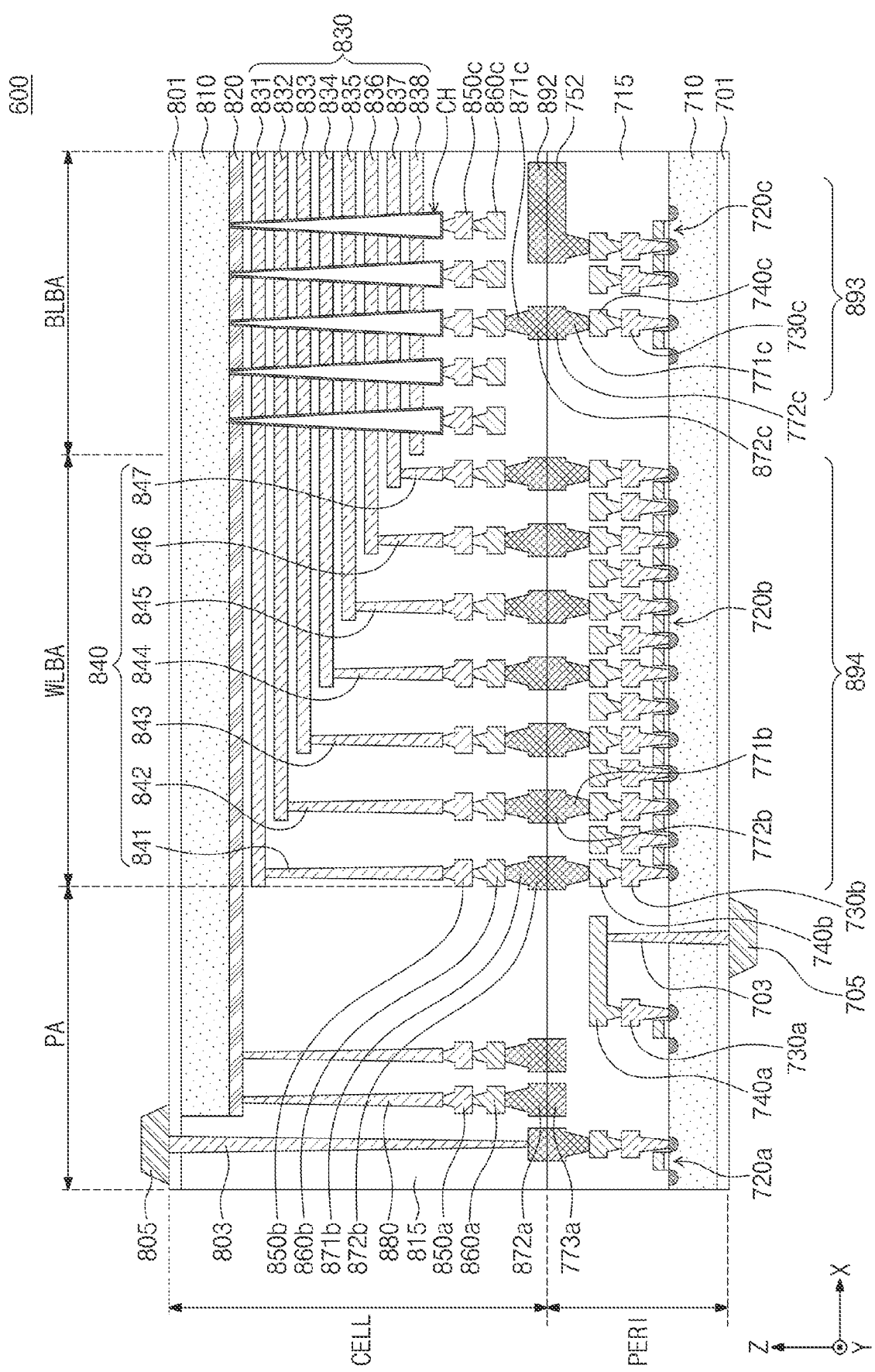
FIG. 16 is a cross-sectional view illustrating a memory device according to an embodiment of the present disclosure.

FIG. 16 is a diagram illustrating a memory device 600 according to another example embodiment.

Referring to FIG. 16, a memory device 600 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals may include copper (Cu) using a Cu-to-Cu bonding. The example embodiment, however, may not be limited thereto. For example, the bonding metals may also be formed of aluminum (Al) or tungsten (W).

Each of the peripheral circuit region PERI and the cell region CELL of the memory device 600 may include an external pad bonding area PA, a word line bonding area WLBA, and a bit line bonding area BLBA.

The peripheral circuit region PERI may include a first substrate 710, an interlayer insulating layer 715, a plurality of circuit elements 720a, 720b, and 720c formed on the first substrate 710, first metal layers 730a, 730b, and 730c respectively connected to the plurality of circuit elements 720a, 720b, and 720c, and second metal layers 740a, 740b, and 740c formed on the first metal layers 730a, 730b, and 730c. In an example embodiment, the first metal layers 730a, 730b, and 730c may be formed of tungsten having relatively high electrical resistivity and the second metal layers 740a, 740b, and 740c may be formed of copper having relatively low electrical resistivity.

In an example embodiment illustrate in FIG. 16, although only the first metal layers 730a, 730b, and 730c and the second metal layers 740a, 740b, and 740c are shown and described, the example embodiment is not limited thereto and one or more additional metal layers may be further formed on the second metal layers 740a, 740b, and 740c. At least a portion of the one or more additional metal layers formed on the second metal layers 740a, 740b, and 740c may be formed of aluminum or the like having a lower electrical resistivity than those of copper forming the second metal layers 740*a*, 740*b*, and 740*c*.

The interlayer insulating layer 715 may be disposed on the first substrate 710 and cover the plurality of circuit elements 720*a*, 720*b*, and 720*c*, the first metal layers 730*a*, 730*b*, and 730*c*, and the second metal layers 740*a*, 740*b*, and 740*c*. The interlayer insulating layer 715 may include an insulating material such as silicon oxide, silicon nitride, or the like.

Lower bonding metals 771*b* and 772*b* may be formed on the second metal layer 740*b* in the word line bonding area WLBA. In the word line bonding area WLBA, the lower bonding metals 771*b* and 772*b* in the peripheral circuit region PERI may be electrically bonded to upper bonding metals 871*b* and 872*b* of the cell region CELL. The lower bonding metals 771*b* and 772*b* and the upper bonding metals 871*b* and 872*b* may be formed of aluminum, copper, tungsten, or the like. Further, the upper bonding metals 871*b* and 872*b* in the cell region CELL may be referred as first metal pads and the lower bonding metals 771*b* and 772*b* in the peripheral circuit region PERI may be referred as second metal pads.

The cell region CELL may include at least one memory block. The cell region CELL may include a second substrate 810 and a common source line 820. On the second substrate 810, a plurality of word lines 831 to 838 (i.e., 830) may be stacked in a direction (a Z-axis direction), perpendicular to an upper surface of the second substrate 810. At least one string select line and at least one ground select line may be arranged on and below the plurality of word lines 830, respectively, and the plurality of word lines 830 may be disposed between the at least one string select line and the at least one ground select line.

In the bit line bonding area BLBA, a channel structure CH may extend in a direction (a Z-axis direction), perpendicular to the upper surface of the second substrate 810, and pass through the plurality of word lines 830, the at least one string select line, and the at least one ground select line. The channel structure CH may include a data storage layer, a channel layer, a buried insulating layer, and the like and the channel layer may be electrically connected to a first metal layer 850*c* and a second metal layer 860*c*. For example, the first metal layer 850*c* may be a bit line contact and the second metal layer 860*c* may be a bit line. In an example embodiment, the bit line 860*c* may extend in a first direction (a Y-axis direction), parallel to the upper surface of the second substrate 810.

In an example embodiment illustrated in FIG. 16, an area in which the channel structure CH, the bit line 860*c*, and the like are disposed may be defined as the bit line bonding area BLBA. In the bit line bonding area BLBA, the bit line 860*c* may be electrically connected to the circuit elements 720*c* providing a page buffer 893 in the peripheral circuit region PERI. The bit line 860*c* may be connected to upper bonding metals 871*c* and 872*c* in the cell region CELL, and the upper bonding metals 871*c* and 872*c* may be connected to lower bonding metals 771*c* and 772*c* connected to the circuit elements 720*c* of the page buffer 893. In an example embodiment, a program operation may be executed based on a page unit as write data of the page-unit is stored in the page buffer 893 and a read operation may be executed based on a sub-page unit as read data of the sub-page unit is stored in the page buffer 893. Also, in the program operation and the read operation, units of data transmitted through bit lines may be different from each other.

In the word line bonding area WLBA, the plurality of word lines 830 may extend in a second direction (an X-axis direction), parallel to the upper surface of the second substrate 810 and perpendicular to the first direction, and may be connected to a plurality of cell contact plugs 841 to 847 (i.e., 840). The plurality of word lines 830 and the plurality of cell contact plugs 840 may be connected to each other in pads provided by at least a portion of the plurality of word lines 830 extending in different lengths in the second direction. A first metal layer 850*b* and a second metal layer 860*b* may be connected to an upper portion of the plurality of cell contact plugs 840 connected to the plurality of word lines 830, sequentially. The plurality of cell contact plugs 840 may be connected to the peripheral circuit region PERI by the upper bonding metals 871*b* and 872*b* of the cell region CELL and the lower bonding metals 771*b* and 772*b* of the peripheral circuit region PERI in the word line bonding area WLBA.

The plurality of cell contact plugs 840 may be electrically connected to the circuit elements 720*b* forming a row decoder 894 in the peripheral circuit region PERI. In an example embodiment, operating voltages of the circuit elements 720*b* of the row decoder 894 may be different than operating voltages of the circuit elements 720*c* forming the page buffer 893. For example, operating voltages of the circuit elements 720*c* forming the page buffer 893 may be greater than operating voltages of the circuit elements 720*b* forming the row decoder 894.

A common source line contact plug 880 may be disposed in the external pad bonding area PA. The common source line contact plug 880 may be formed of a conductive material such as a metal, a metal compound, polysilicon, or the like and may be electrically connected to the common source line 820. A first metal layer 850*a* and a second metal layer 860*a* may be stacked on an upper portion of the common source line contact plug 880, sequentially. For example, an area in which the common source line contact plug 880, the first metal layer 850*a*, and the second metal layer 860*a* are disposed may be defined as the external pad bonding area PA.

Input-output pads 705 and 805 may be disposed in the external pad bonding area PA. Referring to FIG. 16, a lower insulating film 701 covering a lower surface of the first substrate 710 may be formed below the first substrate 710 and a first input-output pad 705 may be formed on the lower insulating film 701. The first input-output pad 705 may be connected to at least one of the plurality of circuit elements 720*a*, 720*b*, and 720*c* disposed in the peripheral circuit region PERI through a first input-output contact plug 703 and may be separated from the first substrate 710 by the lower insulating film 701. In addition, a side insulating film may be disposed between the first input-output contact plug 703 and the first substrate 710 to electrically separate the first input-output contact plug 703 and the first substrate 710.

Referring to FIG. 16, an upper insulating film 801 covering the upper surface of the second substrate 810 may be formed on the second substrate 810 and a second input-output pad 805 may be disposed on the upper insulating layer 801. The second input-output pad 805 may be connected to at least one of the plurality of circuit elements 720*a*, 720*b*, and 720*c* disposed in the peripheral circuit region PERI through a second input-output contact plug 803. In the example embodiment, the second input-output pad 805 is electrically connected to a circuit element 720*a*.

According to embodiments, the second substrate 810 and the common source line 820 may not be disposed in an area in which the second input-output contact plug 803 is disposed. Also, the second input-output pad 805 may not overlap the word lines 830 in the third direction (the Z-axis direction). Referring to FIG. 16, the second input-output contact plug 803 may be separated from the second substrate 810 in a direction, parallel to the upper surface of the second substrate 810, and may pass through the interlayer insulating layer 815 of the cell region CELL to be connected to the second input-output pad 805.

According to embodiments, the first input-output pad 705 and the second input-output pad 805 may be selectively formed. For example, the memory device 600 may include only the first input-output pad 705 disposed on the first substrate 710 or the second input-output pad 805 disposed on the second substrate 810. Alternatively, the memory device 600 may include both the first input-output pad 705 and the second input-output pad 805.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 600 may include a lower metal pattern 773*a*, corresponding to an upper metal pattern 872*a* formed in an uppermost metal layer of the cell region CELL and having the same cross-sectional shape as the upper metal pattern 872*a* of the cell region CELL, so as to be connected to each other in an uppermost metal layer of the peripheral circuit region PERI. In the peripheral circuit region PERI, the lower metal pattern 773*a* formed in the uppermost metal layer of the peripheral circuit region PERI may not be connected to a contact. Similarly, in the external pad bonding area PA, an upper metal pattern 872*a*, corresponding to the lower metal pattern 773*a* formed in an uppermost metal layer of the peripheral circuit region PERI and having the same shape as a lower metal pattern 773*a* of the peripheral circuit region PERI, may be formed in an uppermost metal layer of the cell region CELL.

The lower bonding metals 771*b* and 772*b* may be formed on the second metal layer 740*b* in the word line bonding area WLBA. In the word line bonding area WLBA, the lower bonding metals 771*b* and 772*b* of the peripheral circuit region PERI may be electrically connected to the upper bonding metals 871*b* and 872*b* of the cell region CELL by a Cu-to-Cu bonding.

Further, in the bit line bonding area BLBA, an upper metal pattern 892, corresponding to a lower metal pattern 752 formed in the uppermost metal layer of the peripheral circuit region PERI and having the same cross-sectional shape as the lower metal pattern 752 of the peripheral circuit region PERI, may be formed in an uppermost metal layer of the cell region CELL. A contact may not be formed on the upper metal pattern 892 formed in the uppermost metal layer of the cell region CELL.

In an example embodiment, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

In an embodiment, the memory device 600 of FIG. 16 may be the memory device 120 described with reference to FIG. 2 and may operate based on at least one of the operation methods described with reference to FIGS. 1 to 15. For example, after performing an operation, the memory device 600 may perform the mode recovery operation such that the plurality of wordlines 830 are set with the recovery voltage. In this case, the memory device 600 may pre-charge the channel CH through a bitline or a common source line. As such, after the mode recovery operation, as a voltage difference of wordlines and channels decreases, the reliability of the memory device 600 is improved.

Figure 17:
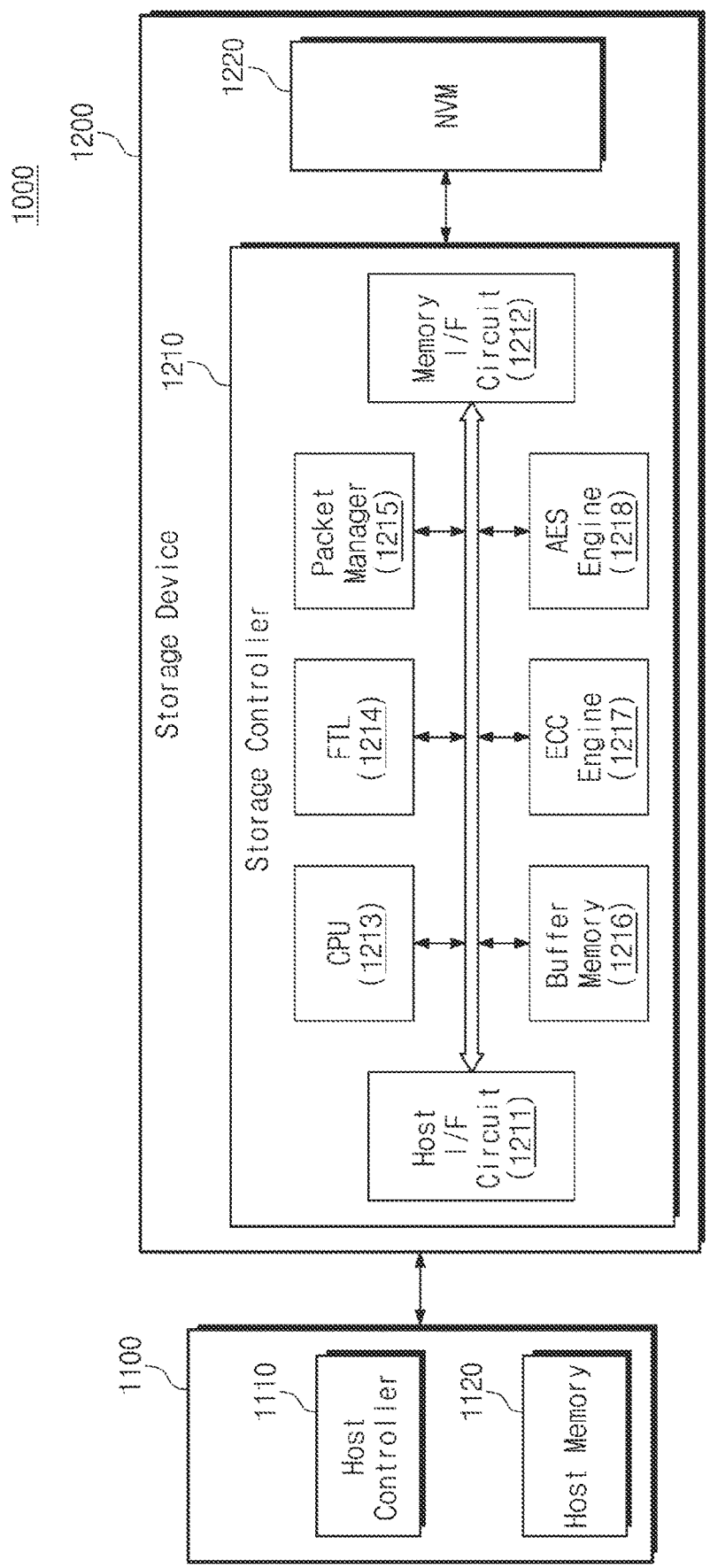
FIG. 17 is a block diagram illustrating a host-storage system according to an embodiment of the present disclosure.

FIG. 17 is a block diagram of a host storage system 1000 according to an example embodiment.

The host storage system 1000 may include a host 1100 and a storage device 1200. Further, the storage device 1200 may include a storage controller 1210 and an NVM 1220. According to an example embodiment, the host 1100 may include a host controller 1110 and a host memory 1120. The host memory 1120 may serve as a buffer memory configured to temporarily store data to be transmitted to the storage device 1200 or data received from the storage device 1200.

The storage device 1200 may include storage media configured to store data in response to requests from the host 1100. As an example, the storage device 1200 may include at least one of an SSD, an embedded memory, and a removable external memory. When the storage device 1200 is an SSD, the storage device 1200 may be a device that conforms to an NVMe standard. When the storage device 1200 is an embedded memory or an external memory, the storage device 1200 may be a device that conforms to a UFS standard or an eMMC standard. Each of the host 1100 and the storage device 1200 may generate a packet according to an adopted standard protocol and transmit the packet.

When the NVM 1220 of the storage device 1200 includes a flash memory, the flash memory may include a 2D NAND memory array or a 3D (or vertical) NAND (VNAND) memory array. As another example, the storage device 1200 may include various other kinds of NVMs. For example, the storage device 1200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 1110 and the host memory 1120 may be implemented as separate semiconductor chips. Alternatively, in some embodiments, the host controller 1110 and the host memory 1120 may be integrated in the same semiconductor chip. As an example, the host controller 1110 may be any one of a plurality of modules included in an application processor (AP). The AP may be implemented as a System on Chip (SoC). Further, the host memory 1120 may be an embedded memory included in the AP or an NVM or memory module located outside the AP.

The host controller 1110 may manage an operation of storing data (e.g., write data) of a buffer region of the host memory 1120 in the NVM 1220 or an operation of storing data (e.g., read data) of the NVM 1220 in the buffer region.

The storage controller 1210 may include a host interface 1211, a memory interface 1212, and a CPU 1213. Further, the storage controller 1210 may further include a flash translation layer (FTL) 1214, a packet manager 1215, a buffer memory 1216, an error correction code (ECC) engine 1217, and an advanced encryption standard (AES) engine 1218. The storage controller 1210 may further include a working memory (not shown) in which the FTL 1214 is loaded. The CPU 1213 may execute the FTL 1214 to control data write and read operations on the NVM 1220.

The host interface 1211 may transmit and receive packets to and from the host 1100. A packet transmitted from the host 1100 to the host interface 1211 may include a command or data to be written to the NVM 1220. A packet transmitted from the host interface 1211 to the host 1100 may include a response to the command or data read from the NVM 1220. The memory interface 1212 may transmit data to be written to the NVM 1220 to the NVM 1220 or receive data read from the NVM 1220. The memory interface 1212 may be configured to comply with a standard protocol, such as Toggle or open NAND flash interface (ONFI).

The FTL 1214 may perform various functions, such as an address mapping operation, a wear-leveling operation, and a garbage collection operation. The address mapping operation may be an operation of converting a logical address received from the host 1100 into a physical address used to actually store data in the NVM 1220. The wear-leveling operation may be a technique for preventing excessive deterioration of a specific block by allowing blocks of the NVM 1220 to be uniformly used. As an example, the wear-leveling operation may be implemented using a firmware technique that balances erase counts of physical blocks. The garbage collection operation may be a technique for ensuring usable capacity in the NVM 1220 by erasing an existing block after copying valid data of the existing block to a new block.

The packet manager 1215 may generate a packet according to a protocol of an interface, which comports with the host 1100, or parse various types of information from the packet received from the host 1100. In addition, the buffer memory 1216 may temporarily store data to be written to the NVM 1220 or data to be read from the NVM 1220. Although the buffer memory 1216 may be a component included in the storage controllers 1210, the buffer memory 1216 may be outside the storage controller 1210.

The ECC engine 1217 may perform error detection and correction operations on read data read from the NVM 1220. More specifically, the ECC engine 1217 may generate parity bits for write data to be written to the NVM 1220 and the generated parity bits may be stored in the NVM 1220 together with write data. During the reading of data from the NVM 1220, the ECC engine 1217 may correct an error in the read data by using the parity bits read from the NVM 1220 along with the read data and output error-corrected read data.

The AES engine 1218 may perform at least one of an encryption operation and a decryption operation on data input to the storage controller 1210 by using a symmetric-key algorithm.

In an embodiment, the nonvolatile memory 1220 of the storage device 1200 may be the memory device 120 described with reference to FIG. 2 and may operate based on at least one of the operation methods described with reference to FIGS. 1 to 15. As such, the nonvolatile memory 1220 or the storage device 1200 with improved reliability is provided.

According to the present disclosure, a memory device may pre-charge a channel with a given voltage (or may perform a channel pre-charge operation) in a mode recovery operation. In this case, after the mode recovery operation, as a voltage difference of a channel and a wordline decreases, the disturbance in memory cells may be prevented. Accordingly, an operation method of a memory device with improved reliability, which includes a memory block connected with a plurality of wordlines, is provided.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operation method of a memory device which includes a memory block connected to wordlines, the method comprising:
   receiving a command from a memory controller;
   activating a first block selection signal to control first pass transistors to connect the wordlines to driving lines;
   while the first block selection signal is activated, controlling the wordlines to perform a first operation corresponding to the command, wherein the first operation comprises a program operation or a read operation; and
   after the first operation is completed:
      maintaining the first block selection signal as activated from the first operation, and, while the first block selection signal is maintained activated, pre-charging channels of the memory block with a first voltage, and
      performing a mode recovery operation that includes setting the wordlines to a recovery voltage,
   wherein the mode recovery operation includes deactivating the first block selection signal.

2. The method of claim 1, comprising floating the wordlines after the mode recovery operation is completed.

3. The method of claim 1, wherein pre-charging the channels of the memory block with the first voltage includes applying a second voltage to bitlines connected to the memory block.

4. The method of claim 3, wherein pre-charging the channels of the memory block with the first voltage includes floating a common source line connected to the memory block.

5. The method of claim 3, wherein:
   performing the mode recovery operation comprises activating a bitline control gate connected to the bitlines during a first time, and
   the second voltage is applied to the bitlines during the first time.

6. The method of claim 5, wherein:
   the second voltage is applied to the bitlines during a second time, the method comprises applying a ground voltage to the bitlines during a third time after the second time, and the first time includes the second time and the third time.

7. The method of claim 1, wherein pre-charging the channels of the memory block with the first voltage includes applying a third voltage to a common source line connected to the memory block.

8. The method of claim 7, wherein pre-charging the channels of the memory block with the first voltage includes floating bitlines connected to the memory block.

9. The method of claim 7, wherein:
performing the mode recovery operation comprises activating a common source line control gate connected to the common source line during a first time, and
the third voltage is applied to the common source line during the first time.

10. The method of claim 7, wherein:
performing the mode recovery operation comprises activating a common source line control gate connected to the common source line during a first time,
the third voltage is applied to the common source line during a second time,
the method comprises applying a ground voltage to the common source line during a third time after the second time, and
the first time includes the second time and the third time.

11. The method of claim 1, wherein controlling the wordlines to perform the first operation comprises, to complete the first operation:
suspending the first operation in response to a suspend command received from the memory controller;
suspending the first operation in response to a reset command received from the memory controller; or
suspending the first operation in response to a sudden power-off event.

12. An operation method of a memory device which includes a memory block connected to wordlines, a string selection line, and a ground selection line, the method comprising:
receiving a command from a memory controller;
activating a first block selection signal to control first pass transistors to connect the wordlines to driving lines;
while the first block selection signal is activated, controlling the wordlines to perform a first operation corresponding to the command, wherein the first operation comprises a program operation or a read operation;
maintaining the first block selection signal as activated from the first operation, and, while the first block selection signal is maintained activated:
pre-charging channels of the memory block with a first voltage, and
setting the wordlines connected to the memory block to a recovery voltage, and setting the string selection line and the ground selection line to a ground voltage; and
deactivating the first block selection signal.

13. The method of claim 12, comprising, after the first block selection signal is deactivated, floating the wordlines with the recovery voltage maintained.

14. The method of claim 12, wherein pre-charging the channels of the memory block with the first voltage includes;
applying a second voltage to bitlines connected to the memory block; and
floating a common source line connected to the memory block.

15. The method of claim 14, wherein setting the wordlines to the recovery voltage and setting the string selection line and the ground selection line to the ground voltage includes:
after a voltage of the string selection line is lower than a threshold voltage of a string selection transistor, setting the bitlines to the ground voltage.

16. The method of claim 14, wherein setting the wordlines to the recovery voltage and setting the string selection line and the ground selection line to the ground voltage includes;
after a voltage of the string selection line is lower than a threshold voltage of a string selection transistor connected to the string selection line, floating the bitlines.

17. The method of claim 12, wherein pre-charging the channels of the memory block with the first voltage includes:
applying a second voltage to a common source line connected to the memory block; and
floating bitlines connected to the memory block.

18. The method of claim 17, wherein setting the wordlines to the recovery voltage and setting the string selection line and the ground selection line to the ground voltage includes:
after a voltage of the ground selection line is lower than a threshold voltage of a ground selection transistor connected to the ground selection line, setting the common source line to the ground voltage.

19. The method of claim 17, wherein setting the wordlines to the recovery voltage and setting the string selection line and the ground selection line to the ground voltage includes:
after a voltage of the ground selection line is lower than a threshold voltage of a ground selection transistor connected to the ground selection line, floating the common source line.

20. An operation method of a memory device which includes a memory block connected with wordlines, a string selection line and a ground selection line, the method comprising:
receiving a read command from a memory controller;
performing a wordline setup operation in response to the read command by applying a non-selection read voltage to unselected wordlines among the wordlines, applying a pass voltage to the string selection line, and applying the pass voltage to the ground selection line;
performing a sensing operation by applying at least one read voltage to a selected wordline among the wordlines; and
performing a mode recovery operation such that the wordlines are set with a recovery voltage and the string selection line and the ground selection line are set with a ground voltage, wherein:
the mode recovery operation includes an operation of pre-charging channels of the memory block through bitlines or a common source line connected with the memory block,
a first block selection signal corresponding to the memory block is activated during the wordline setup operation, the sensing operation, and the mode recovery operation, and
the first block selection signal is deactivated after the mode recovery operation is completed.

* * * * *